United States Patent
Yuan et al.

(10) Patent No.: US 11,632,757 B2
(45) Date of Patent: Apr. 18, 2023

(54) BEAM GROUP USER EQUIPMENT (UE) CAPABILITY

(71) Applicant: QUALCOMM Incorporated, San Diego, CA (US)

(72) Inventors: Fang Yuan, Beijing (CN); Yan Zhou, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/132,639

(22) Filed: Dec. 23, 2020

(65) Prior Publication Data

US 2022/0201669 A1 Jun. 23, 2022

(51) Int. Cl.
*H04W 72/04* (2009.01)
*H04W 16/28* (2009.01)
*H04B 7/0408* (2017.01)
*H04W 72/044* (2023.01)

(52) U.S. Cl.
CPC ....... *H04W 72/046* (2013.01); *H04W 72/048* (2013.01)

(58) Field of Classification Search
None
See application file for complete search history.

(56) References Cited

U.S. PATENT DOCUMENTS

| | | | |
|---|---|---|---|
| 2017/0141454 A1* | 5/2017 | Welle | H01Q 21/065 |
| 2020/0120604 A1* | 4/2020 | Nam | H04W 76/28 |
| 2020/0192443 A1* | 6/2020 | Huang | G05D 23/193 |
| 2021/0175919 A1* | 6/2021 | Badic | H04B 7/0897 |
| 2022/0095235 A1* | 3/2022 | Zhang | H04W 52/0254 |
| 2022/0123817 A1* | 4/2022 | Karjalainen | G01S 5/0226 |
| 2022/0123818 A1* | 4/2022 | Li | H04B 7/0408 |
| 2022/0304038 A1* | 9/2022 | Zhang | H04B 7/088 |

* cited by examiner

*Primary Examiner* — Sai Aung
(74) *Attorney, Agent, or Firm* — Holland & Hart LLP/Qualcomm Incorporated

(57) ABSTRACT

Methods, systems, and devices for wireless communications are described. In some examples, a user equipment (UE) may transmit, to a base station, indications of capability levels of the UE. Each capability level of the UE may correspond to a respective beam group supported by the UE in a UE cooperation mode. The UE may include sets of antenna components at the UE or distributed across the UE and on or more other devices in the UE cooperation mode. Each set of antenna components may form the respective beam groups. The base station may receive the capability levels of the UE and select an activated capability level for the UE from the reported capability levels. The base station may signal the activated capability level to the UE and perform communications with the UE according to the activated capability level and the corresponding beam group.

30 Claims, 22 Drawing Sheets

BEAM GROUP USER EQUIPMENT (UE) CAPABILITY

FIELD OF TECHNOLOGY

The following relates to wireless communications, including beam group user equipment (UE) capability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may communicate with a base station using one or more panels of the UE, and each panel may include a set of antenna ports for communications by the UE. The base station may communicate with the UE using multiple beams that are each associated with the same UE capabilities. In some cases, a UE may be configured to operate in a UE cooperation mode, in which the UE may support communications using one or more panels located across multiple devices, which may result in different capabilities of the UE.

SUMMARY

The described techniques relate to improved methods, systems, devices, and apparatuses that support beam group user equipment (UE) capability. Generally, the described techniques provide for a UE operating in a UE cooperation mode to report multiple UE capability levels supported by the UE to a base station. The UE may transmit an indication of multiple capability levels of the UE to the base station. Each capability level may be associated with a beam group formed by the UE. For example, the UE may include multiple antenna components that may be formed into transmission/reception points (TRPs), or panels, at the UE, and each beam group may be associated with a respective panel (e.g., and a corresponding set of antenna components). Additionally or alternatively, a base station may configure the UE with a set of transmission configuration indicator (TCI) states, and each beam group may be associated with a TCI state list. In some examples, the UE may cooperate with one or more other devices to form a virtual panel across the devices, and a beam group and corresponding UE capability level may be associated with the virtual panel. The base station may receive the indications of the multiple UE capability levels and may select an activated capability level for the UE from the set of multiple reported UE capability levels. The base station may transmit signaling to the UE indicating an activated capability level for communications. The base station and the UE may apply the activated capability level and may perform communications based on the activated capability level.

A method for wireless communications at a UE is described. The method may include transmitting, to a base station, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode, transmitting, to the base station, a second indication of a second capability level of the UE, the second capability level corresponding to a second beam group of the set of multiple beam groups, receiving signaling that indicates an activated capability level for the UE, where the activated capability level is one of the first capability level or the second capability level, and communicating with the base station based on the activated capability level using a corresponding beam group and the respective set of antenna components.

An apparatus for wireless communications at a UE is described. The apparatus may include a processor, memory in electronic communication with the processor, and instructions stored in the memory. The instructions may be executable by the processor to cause the apparatus to transmit, to a base station, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode, transmit, to the base station, a second indication of a second capability level of the UE, the second capability level corresponding to a second beam group of the set of multiple beam groups, receive signaling that indicates an activated capability level for the UE, where the activated capability level is one of the first capability level or the second capability level, and communicate with the base station based on the activated capability level using a corresponding beam group and the respective set of antenna components.

Another apparatus for wireless communications at a UE is described. The apparatus may include means for transmitting, to a base station, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode, means for transmitting, to the base station, a second indication of a second capability level of the UE, the second capability level corresponding to a second beam group of the set of multiple beam groups, means for receiving signaling that indicates an activated capability level for the UE, where the activated capability level is one of the first capability level or the second capability level, and means for communicating with the base station based on the activated capability level using a corresponding beam group and the respective set of antenna components.

A non-transitory computer-readable medium storing code for wireless communications at a UE is described. The code may include instructions executable by a processor to transmit, to a base station, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode, transmit, to the base station, a second indication of a second capability level of the UE, the second capability level corresponding to a second beam group of the set of multiple beam groups, receive signaling that indicates an activated capability level for the UE, where the activated capability level is one of the first capability level or the second capability level, and communicate with the base station based on the activated capability level using a corresponding beam group and the respective set of antenna components.

Some examples of the method, apparatuses, and non-transitory computer-readable medium described herein may further include operations, features, means, or instructions for determining a first beam group ID for the first beam group based on a first panel ID for a first antenna panel supported by the UE, the first antenna panel including a first set of antenna components associated with a first number of antenna ports, where the first indication includes the first beam group ID and determining a second beam group ID for the second beam group based on a second panel ID for a second antenna panel supported by the UE, the second antenna panel includes a second set of antenna components associated with a second number of antenna ports, where the second indication includes the second beam group ID.

Some examples of the method, apparatuses, and non-transitory computer-readable medium described herein may further include operations, features, means, or instructions for receiving, from the base station, a first configuration for a first TCI list, the first TCI list including a first set of multiple transmission configuration states for the UE, where the first TCI list may be associated with the first beam group and receiving, from the base station, a second configuration for a second TCI list, the second TCI list including a second set of multiple transmission configuration states for the UE, where the second TCI list may be associated with the second beam group.

Some examples of the method, apparatuses, and non-transitory computer-readable medium described herein may further include operations, features, means, or instructions for determining a first beam group ID for the first beam group based on a first ID for the first TCI list, where the first indication includes the first beam group ID and determining a second beam group ID for the second beam group based on a second ID for the second TCI list, where the second indication includes the second beam group ID.

Some examples of the method, apparatuses, and non-transitory computer-readable medium described herein may further include operations, features, means, or instructions for determining a first antenna panel supported by the UE, where the first antenna panel may be a physical antenna panel at the UE and the first indication indicates the first antenna panel and determining a second antenna panel supported by the UE, where the second antenna panel may be a virtualized antenna panel including at least a second physical antenna panel at another device and the second indication indicates the second antenna panel.

Some examples of the method, apparatuses, and non-transitory computer-readable medium described herein may further include operations, features, means, or instructions for applying the activated capability level after an activation time period, where the first beam group may be associated with a first activation time period and the second beam group may be associated with a second activation time period.

Some examples of the method, apparatuses, and non-transitory computer-readable medium described herein may further include operations, features, means, or instructions for determining the first capability level of the UE based on a first number of multiple input multiple output (MIMO) transmission layers supported by the UE for the first beam group, where the first number of MIMO transmission layers supported by the UE may be based on a first number of antenna ports and determining the second capability level of the UE based on a second number of MIMO transmission layers supported by the UE for the second beam group, where the second number of MIMO transmission layers supported by the UE may be based on a second number of antenna ports.

Some examples of the method, apparatuses, and non-transitory computer-readable medium described herein may further include operations, features, means, or instructions for determining the first capability level of the UE based on a first processing time supported by the UE, where the first processing time may be a first time gap between receiving downlink control information (DCI) and data scheduled by the downlink control information for the UE according to the first beam group and determining the second capability level of the UE based on a second processing time supported by the UE, where the second processing time may be a second time gap between receiving DCI and data scheduled by the downlink control information for the UE according to the second beam group.

Some examples of the method, apparatuses, and non-transitory computer-readable medium described herein may further include operations, features, means, or instructions for determining the first capability level of the UE based on a first number of beam switches per slot supported by the UE and determining the second capability level of the UE based on a second number of beam switches per slot supported by the UE.

In some examples of the method, apparatuses, and non-transitory computer-readable medium described herein, the first number of beam switches per slot and the second number of beam switches per slot supported by the UE may be based on a radio frequency switching time, a configuration between antenna panels at the UE, or both.

In some examples of the method, apparatuses, and non-transitory computer-readable medium described herein, receiving the signaling may include operations, features, means, or instructions for receiving a medium access control element (MAC-CE) indicating the activated capability level, where the MAC-CE indicates an antenna panel ID or a TCI state list ID associated with the activated capability level.

A method for wireless communications at a base station is described. The method may include receiving, from a UE, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode, receiving a second indication of a second capability level of the UE, the second capability level corresponding to a second beam group of the set of multiple beam groups, selecting an activated capability level for the UE from the first capability level and the second capability level, and transmitting, to the UE, signaling that indicates the activated capability level, where the activated capability level is one of the first capability level or the second capability level.

An apparatus for wireless communications at a base station is described. The apparatus may include a processor, memory in electronic communication with the processor, and instructions stored in the memory. The instructions may be executable by the processor to cause the apparatus to receive, from a UE, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode, receive a second indication of a second capability level of the UE, the second capability level corresponding to a second beam group of the set of multiple beam groups, select an activated capability level for the UE from the first capability level and the second capability level, and transmit, to the UE, signaling that indicates the activated capability level, where the activated capability level is one of the first capability level or the second capability level.

Another apparatus for wireless communications at a base station is described. The apparatus may include means for receiving, from a UE, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode, means for receiving a second indication of a second capability level of the UE, the second capability level corresponding to a second beam group of the set of multiple beam groups, means for selecting an activated capability level for the UE from the first capability level and the second capability level, and means for transmitting, to the UE, signaling that indicates the activated capability level, where the activated capability level is one of the first capability level or the second capability level.

A non-transitory computer-readable medium storing code for wireless communications at a base station is described. The code may include instructions executable by a processor to receive, from a UE, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode, receive a second indication of a second capability level of the UE, the second capability level corresponding to a second beam group of the set of multiple beam groups, select an activated capability level for the UE from the first capability level and the second capability level, and transmit, to the UE, signaling that indicates the activated capability level, where the activated capability level is one of the first capability level or the second capability level.

Some examples of the method, apparatuses, and non-transitory computer-readable medium described herein may further include operations, features, means, or instructions for communicating with the UE according to the activated capability level and a corresponding beam group, where the activated capability level may be associated with the corresponding beam group for communications with the UE.

Some examples of the method, apparatuses, and non-transitory computer-readable medium described herein may further include operations, features, means, or instructions for transmitting, to the UE, a first configuration for a first TCI list, the first TCI list including a first set of multiple transmission configuration states for the UE, where the first TCI list may be associated with the first beam group and transmitting, to the UE, a second configuration for a second TCI list, the second TCI list including a second set of multiple transmission configuration states for the UE, where the second TCI list may be associated with the second beam group.

Some examples of the method, apparatuses, and non-transitory computer-readable medium described herein may further include operations, features, means, or instructions for communicating with the UE according to a number of MIMO transmission layers, where the number of MIMO transmission layers may be based on the activated capability level.

Some examples of the method, apparatuses, and non-transitory computer-readable medium described herein may further include operations, features, means, or instructions for transmitting, to the UE, DCI that schedules data for the UE and communicating, after an activation time period, the data with the UE, where the activation time period may be based on the activated capability level.

Some examples of the method, apparatuses, and non-transitory computer-readable medium described herein may further include operations, features, means, or instructions for communicating with the UE using the first beam group, switching from using the first beam group to the second beam group within a slot, and communicating with the UE using the second beam group, where a number of switches between the first beam group and the second beam group within the slot may be based on the activated capability level.

In some examples of the method, apparatuses, and non-transitory computer-readable medium described herein, transmitting the signaling may include operations, features, means, or instructions for transmitting, to the UE, a MAC-CE indicating the activated capability level, where the MAC-CE indicates an antenna panel ID of the UE or a TCI state list ID associated with the activated capability level.

In some examples of the method, apparatuses, and non-transitory computer-readable medium described herein, the base station includes one or more TRPs for communications with the UE.

DETAILED DESCRIPTION

Figure 1:
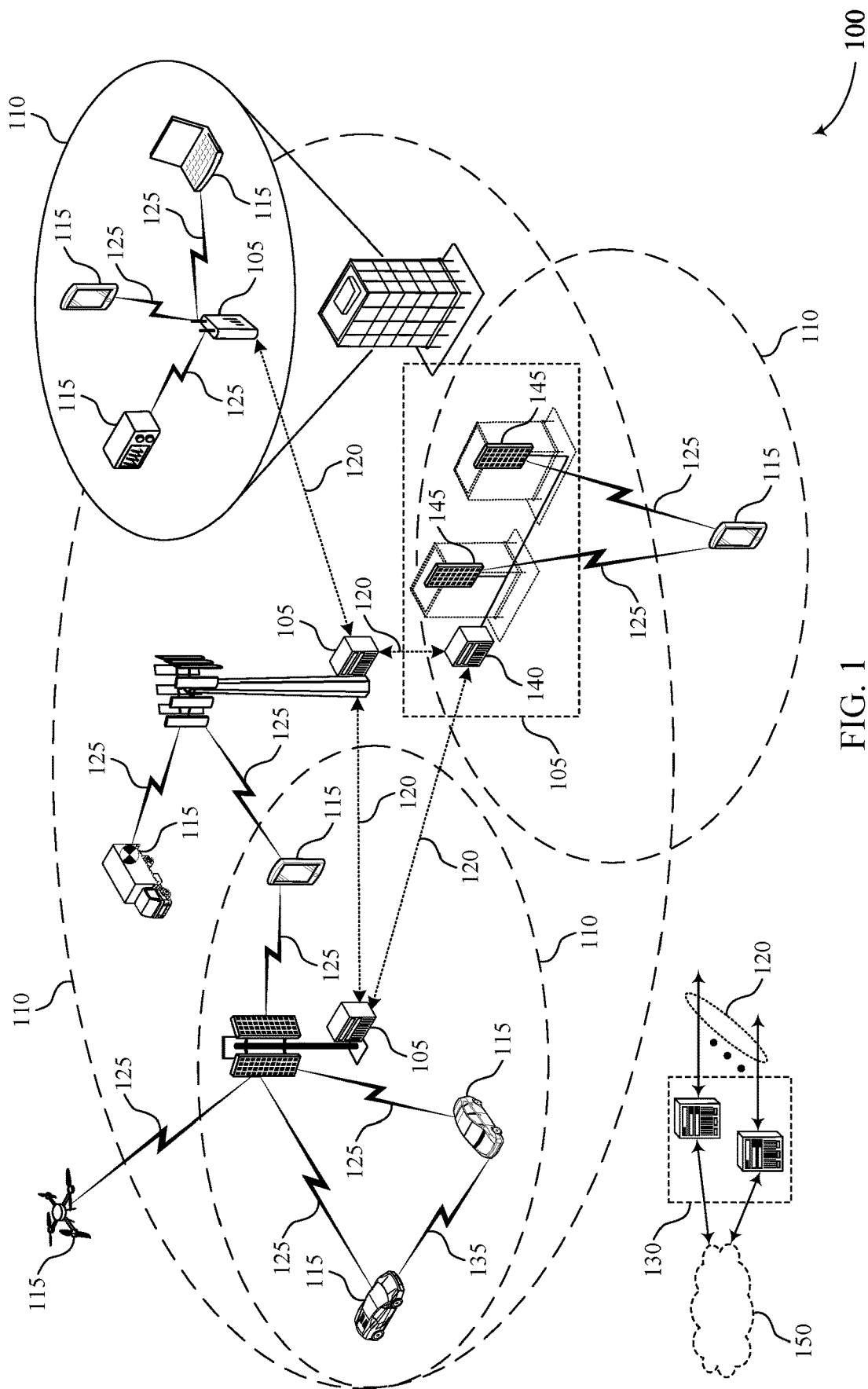
FIG. 1 illustrates an example of a wireless communications system that supports beam group user equipment (UE) capability in accordance with aspects of the present disclosure.

In some wireless communications systems, a user equipment (UE) may include a number of antenna components which may support communications by the UE using a number of antenna port, and the UE may form (e.g., virtualize) one or more panels on the UE that include respective sets of antenna ports. The base station may configure a list of transmission configuration indicator (TCI) states for the UE. In some cases, each TCI state and corresponding beam group used for communications with the UE may be associated with the same UE capabilities for communications. In such cases, the UE may switch panels for communications or form different panels at the UE without indicating the changes to a base station in communication with the UE. The base station may communicate with the UE assuming that a single panel is used at the UE (e.g., and a corresponding number of antenna ports) and using the same UE capabilities (e.g., UE capabilities may be beam independent).

Some UEs may be configured to operate in a UE cooperation mode. During a UE cooperation mode, a UE may distribute antenna panels across the UE and one or more other devices to form a virtual UE or virtual antennas. For example, each device may include one or more panels, and the panels may cooperate to form a virtual panel. During UE cooperation, the capabilities of the UE may change based on different beam groups formed by the cooperative panels. The beam groups may be associated with the number of devices and panels in cooperation, a TCI state of the UE, or both. One or more UE capabilities (e.g., a number of supported multiple-input multiple-output (MIMO) transmission layers, a supported offset between reception of downlink control information (DCI) and reception of downlink data, a number of beam switches supported within a slot, or a combination thereof) may change if the UE transitions from using a single panel for communications to using a different panel(s), such as a virtual panel that includes two or more cooperative panels, because the beam groups formed by the respective panels may be different. In some cases, the base station may not be notified of the changes in UE capabilities during UE cooperation mode, and may continue communicating with the UE assuming the same UE capabilities, which may result in reduced throughput and reduced communication reliability.

As described herein, a UE may report multiple levels of UE capabilities for a UE cooperation mode to a base station, and the base station may transmit signaling indicating an activated capability level for the UE. Each reported level of UE capabilities may be associated with a beam group. The UE may determine the beam group and an identifier (ID) for the beam group based on a panel ID (e.g., a physical panel or a virtual/cooperative panel), a TCI state list ID, or both. In one example, a panel and each antenna port in the panel may be associated with a beam group, and the UE may determine a beam group and corresponding capability level based on the panel. In another example, a base station may configure one or more TCI state lists for the UE, and each TCI state in the list may be associated with a same beam group and a same set of antenna ports at the UE. The UE may determine a beam group and corresponding capability level based on the configured TCI state list. The base station may communicate with the UE according to the reported capability levels. In some examples, the base station may not know which panels or devices are cooperating, and the base station may communicate with the UE according to the reported capability levels assuming a single panel is being used for communications at the UE.

A base station may signal the activated capability level to the UE via medium access control (MAC) control element (CE) (MAC-CE) signaling, radio resource control (RRC) configuration, DCI, or a combination thereof. In some examples, a MAC-CE may be configured to indicate an activated capability level. Additionally or alternatively, the MAC-CE signaling may activate a related panel ID or a related TCI state list ID to indicate a corresponding activated UE capability level. In some examples, different UE capability levels may be associated with different activation time periods for the UE to receive the MAC-CE signaling and apply the activated capability level.

Aspects of the disclosure are initially described in the context of wireless communications systems. Additional aspects are described in the with reference to process flows. Aspects of the disclosure are further illustrated by and described with reference to apparatus diagrams, system diagrams, and flowcharts that relate to beam group UE capability.

FIG. 1 illustrates an example of a wireless communications system 100 that supports beam group UE capability in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an ID for distinguishing neighboring cells (e.g., a physical cell ID (PCID), a virtual cell ID (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

A UE 115 may use multiple antenna panels (e.g., TRPs) for transmission or reception, and each antenna panel may have a corresponding antenna panel ID, which may be unique to the antenna panel. Antenna panels, as shown and described herein, are for illustrative purposes as any antenna component, antenna element, antenna port, TRP, device, etc. may be considered without departing from the scope of the present disclosure. The antenna panels may be associated with a set of downlink or uplink signals and channels, and the antenna panel IDs may be associated with the set of signal or channel IDs (e.g., the antenna panel IDs may be indicated by or derived from the signal or channel IDs).

In one example, a CORESET may be configured with a CORESET pool index. A first antenna panel may be associated with a DCI in a CORESET with a first CORESET pool index value (e.g., 0) and a second antenna panel may be associated with a DCI in a CORESET with a second CORESET pool index value (e.g., 1). In another example, a sounding reference signal (SRS) set ID or SRS resource ID may be associated with the first antenna panel and another SRS set ID or SRS resource ID may be associated with the second antenna panel.

In some aspects, a beam ID or beam group ID may be associated with the first antenna panel, and another beam ID or beam group ID may be associated with the second antenna panel. The beam may be a TCI state or a spatial filter setting for either downlink reception or uplink transmission. The beam may be spatial relation information that is indicated for transmitting uplink signals. The beam may be indicated or associated with a reference signal (RS) such as a synchronization signal block (SSB), channel-state-information (CSI) RS or SRS. If a group of beam IDs are configured, the first portion of the group of beam IDs (e.g., a first half) may be associated with the first antenna panel, and the second portion of the group of beam IDs (e.g., a second half) may be associated with the second antenna panel.

In some aspects, if a pair of TCI states are indicated in DCI, the first TCI state ID in the pair may be associated with the first antenna panel, and the second TCI state ID in the pair may be associated with the second panel. In some examples, an uplink transmit power control configuration may include a close loop index, and a uplink transmission with a first close loop index value (e.g., 0) may be associated with the first antenna panel and another uplink transmission with a second close loop index value (e.g., 1) may be associated with the second antenna panel. An antenna port ID or antenna port group ID may be associated with the first antenna panel, and a different antenna port ID or antenna port group ID may be associated with the second antenna panel, where the antenna port may be a physical uplink shared channel (PUSCH) antenna port, SRS antenna port, a phase-tracking RS antenna port, or a combination thereof, among others. A demodulation reference signal (DMRS) code division multiplexing (CDM) group ID may be associated with the first antenna panel, and a different DMRS CDM group ID may be associated with the second antenna panel. If multiple DMRS CDM groups are indicated, the first DMRS CDM group may be associated with the first antenna panel, and the second DMRS CDM group may be associated the second antenna panel.

A timing advance group (TAG) ID may be associated with the first antenna panel, and a different TAG ID may be associated with the second antenna panel. A physical uplink control channel (PUCCH) resource ID or resource group ID may be associated with the first antenna panel, and a different PUCCH resource ID or resource group ID may be associated with the second antenna panel. If a group of PUCCH resource IDs are configured, the first portion of PUCCH resource IDs may be associated with the first antenna panel, and the second portion of PUCCH resource IDs may be associated with the second antenna panel. A radio network temporary identifier (RNTI) may be associated with the first antenna panel, and a different RNTI may be associated with the second antenna panel. A physical cell identity (PCI) or SSB set ID may be associated with the first antenna panel, a different PCI or SSB set ID may be associated with the second antenna panel. The respective signal or channel IDs (e.g., any of the aforementioned IDs) may thereby be used to refer to or indicate a corresponding panel ID.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may be configured to operate in a UE cooperation mode (e.g., with another UE 115). For example, the UE 115 may cooperation with one or more other devices to form a virtual UE 115 by utilizing distributing antenna panels across the devices. A UE 115 operating in a UE cooperation mode may communicate according to one or more levels of UE capability that may vary based on the number of panels used by the UE 115, and a corresponding number of beam groups associated with the UE 115. The UE 115 may thereby report the one or more UE capability levels supported by the UE 115 to a base station 105. Each capability level may be associated with a beam group formed by the UE 115. For example, each beam group may be associated with a respective physical or virtual panel at the UE 115 or across the multiple devices (e.g., UEs 115) supported by the UE 115 in a UE cooperation mode. Additionally or alternatively, a base station 105 may configure the UE 115 with a set of TCI states, and each beam group may be associated with a TCI state list. The base station 105 may receive the indication(s) of the multiple UE capability levels (e.g., via one or more messages) and may select an activated capability level for the UE 115 from the set of multiple reported UE capability levels. The base station 105 may transmit signaling (e.g., MAC-CE signaling, RRC signaling, DCI, or a combination thereof) to the UE 115 indicating an activated capability level for communications. The base station 105 and the UE 115 may apply the activated capability level and may perform communications based on the activated capability level.

Figure 2:
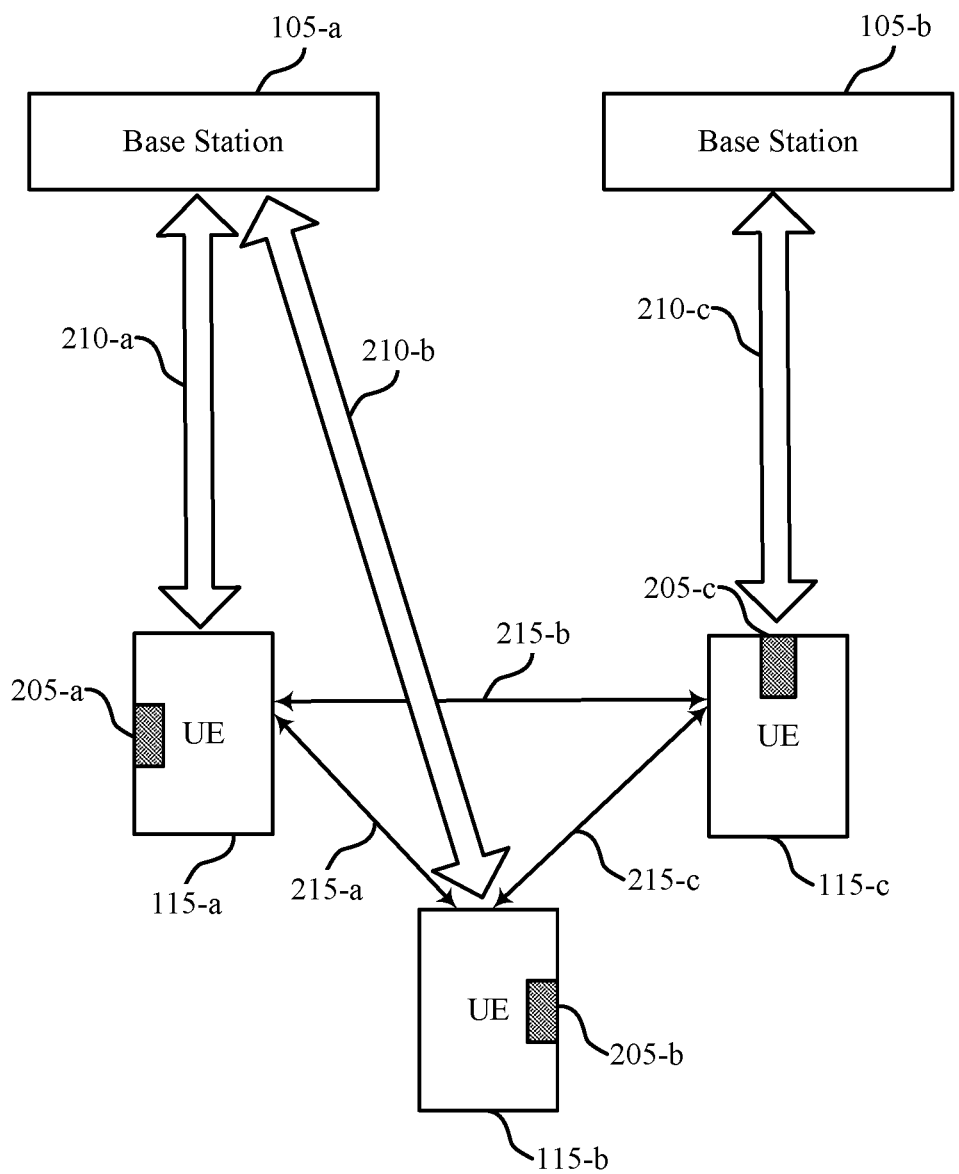
FIG. 2 illustrates an example of a wireless communications system that supports beam group UE capability in accordance with aspects of the present disclosure.

FIG. 2 illustrates an example of a wireless communications system 200 that supports beam group UE capability in accordance with aspects of the present disclosure. The wireless communications system 200 may include base stations 105-a and 105-b and UEs 115-a, 115-b, and 115-c, which may be examples of a base station 105 and a UE 115 as described with reference to FIG. 1. The base stations 105 and UEs 115 may communicate within a geographic coverage area and over communication links 210 (e.g., Uu communication links 210-a, 210-b, and 210-c). UEs 115-a, 115-b, and 115-c may include one or more physical antenna panels 205 (e.g., 205-a, 205-b, and 205-c). In some examples, UEs 115-a, 115-b, and 115-c may be in a UE cooperation mode, such that the physical antenna panels 205 cooperate across devices, and UEs 115-a, 115-b, 115-c, or any combination thereof may cooperate to form a virtual UE 115. The UEs 115 may report levels of UE capabilities to a base station 105 to improve communications with the UEs 115.

In the example of the wireless communications system 200, the network may communicate with the UEs 115 through one or more other access network transmission entities, which may be referred to as radio heads, smart radio heads, or TRPs. Each access network transmission entity may include one or more antenna panels. In some configurations, various functions of each access network transmission entity may be distributed across various network devices (e.g., radio heads and ANCs) or consolidated into a single network device (e.g., a base station 105). Base stations 105-a and 105-b may thereby be associated with one or more TRPs, and UEs 115-a, 115-b, 115-c may communicate with the network via the one or more TRPs associated with base stations 105-a and 105-b.

In some aspects, the UEs 115 may include one or more TRPs (e.g., physical panels 205) for communications at the UEs 115. Each physical panel 205 may include a number of antenna modules or digital antenna ports. In some cases, the physical panels 205 may be co-located on a single UE 115. Additionally or alternatively, the physical panels 205 may be distributed across multiple UEs 115 (e.g., phones, tablets, smart watches, or some other devices). For example, physical panels 205-a, 205-b, and 205-c may be distributed across UEs 115-a, 115-b, and 115-c to form a virtual UE 115. In one example, UE 115-a may form the virtual UE 115 by communicating with UEs 115-b and 115-c via the sidelink communication links 215 (e.g., PC5 links, or the like).

In some examples, a UE 115 may include multiple physical panels 205 (e.g., two panels 205, three panels 205, or some other number of panels 205) that are co-located at the single UE 115. The physical panels 205 may be formed by the UE 115 to include some number of antenna ports. The UE 115 may form the physical panels 205 or switch between physical panels 205 for communications by performing beam refinement. For example, the UE 115 may receive one or more reference signals (e.g., CSI-RS, SRS, or SSB), and the UE 115 may refine the receive beams at the UE 115 (e.g., switch or virtualize the physical panels 205) based on measurements of the reference signals in different transmit and receive beams.

A base station 105 may communicate with the UE 115 via a communication link 210 by assuming a single panel 205 at the UE 115 for transmissions. For example, the base station 105 may not identify or differentiate between the multiple physical panels 205. Instead, the base station 105 may transmit signals to a number of digital antenna ports on the UE 115 (e.g., two digital antenna ports, or some other number). The UE 115 may thereby form new panels 205, or switch between panels 205 for communications without signaling an indication to the base station 105 (e.g., UE implementation). In an example of the wireless communications system 200, base station 105-a may communicate with UE 115-a via communication link 210-a or with UE 115-b via communication link 210-b. Base station 105-b may communicate with UE 115-c via communication link 210-c.

In some aspects, the physical panels 205 may each include one digital antenna port (e.g., or some other number of digital antenna ports), and a UE 115 may form a virtual panel at the UE 115 having two antenna ports by virtualizing two physical panels 205 for operating as a single virtual panel. A base station 105 may identify two antenna ports at the UE 115 for communications, and the base station 105 may be unaware of the two physical panels 205 being combined into a panel (e.g., a virtual panel at the UE 115). Additionally or alternatively, each of the physical panels 205 at the UE 115 may include two antenna ports (e.g., or some other number of digital antenna ports), and the UE 115 may switch between the physical panels 205 for communications without indicating the switch to the base station 105. The base station 105 may transmit signaling to be received at two (e.g., or some other number) digital antenna ports of the UE 115 regardless of which physical panel 205 is used by the UE 115 (e.g., the base station 105 may assume one physical panel 205 at the UE 115).

The base station 105 may thereby assume a same UE capability for all communications with the UE 115. For example, for each beam indicated to the UE 115, the assumption of UE capability by the base station 105 may remain the same. The base station 105 may configure the UE 115 with a list of TCI states, and each TCI state in the list may apply the same UE capabilities reported by the UE 115. For example, the UE 115 may support the same minimum time offset (e.g., K0, K1, K2, etc.), the same minimum transmit power (e.g., Pcmax), the same minimum antenna switching time (e.g., srs-TxSwitch), the same beam report timing (e.g., beamReportTiming), the same number of MIMO transmission layers (e.g., maxLayersMIMO-Adaptation-r16), the same maximum transmit power (e.g., power class), and the like, for each TCI state configured for the UE 115 (e.g., the UE capability for the UE 115 may be beam independent).

In the example of the wireless communications system 200, UEs 115-a, 115-b, and 115-c may be configured to operate in a UE cooperation mode. For instance, the UEs 115 may support cooperation between the physical panels 205 of each UE 115 (e.g., the UEs 115 may leverage Layer 1 and Layer 2 mobility across TRPs). The UEs 115 may communicate with one another using sidelink communication links 215-a, 215-b, and 215-c. During UE cooperation mode, two or more of the UEs 115 may cooperate to form a virtual UE 115, and the virtual UE 115 may communicate with a base station 105 via one or more communication links 210. For example, UE 115-a and UE 115-c may cooperate to form a virtual UE 115, and base station 105-a may communicate with the virtual UE 115 using communication link 210-a (e.g., a Uu link). Additionally or alternatively, the different physical panels 205 across the UEs 115 may communicate with different base stations 105 (e.g., or different TRPs of a base station 105). For example, UE 115-a and UE 115-c may cooperate to form a virtual UE 115, and base station 105-a may communicate with the virtual UE 115 using communication link 210-a and base station 105-b (e.g., or another TRP of base station 105-a) may communicate with the virtual UE 115 using communication link 210-c.

The number of UEs 115 in cooperation, the number of physical panels 205 in cooperation, or both, may change during communications. For example, UEs 115-a and 115-c may cooperate, or UEs 115-a, 115-b, and 115-c may cooperate, or some other number of devices may cooperate. Additionally or alternatively, two devices may cooperate, and each device may have multiple physical panels 205.

During UE cooperation, the UE capabilities may change for different beam groups formed by the UEs 115 (e.g., UE capabilities may be beam dependent). The beam groups may be based on the number of UEs 115, the number of physical panels 205 in cooperation, a TCI state list configured for the respective UE 115, or a combination thereof. The number of supportable antenna ports (e.g., supported MIMO transmission layers), the minimum supported offset time for processing DCI and preparing to receive data, the maximum supported number of beam switches per slot, or the like, may change during UE cooperation.

In one example, UE 115-a and UE 115-b may each include two antenna ports (e.g., physical panels 205-a and 205-b may each include two antenna ports), and may support two MIMO transmission layers accordingly. If UEs 115-a and 115-b cooperate to form a virtual UE 115, the virtual UE 115 may include four antenna ports, and may support four MIMO transmission layers. In another example, UEs 115-a and 115-b may each support a first minimum processing time (e.g., the UEs 115 may support a K0 value of one). If UEs 115-a and 115-b cooperate to form a virtual UE, the virtual UE 115 may support a second minimum processing time that may be twice the first minimum processing time (e.g., the virtual UE 115 may support a K0 value of two). In some examples, each of the UEs 115 may support different numbers of beam switches per slot. During UE cooperation, the number of beam switches supported per slot may depend on the number of UEs 115 in cooperation, an activation of physical panels 205 at the cooperating UEs 115 (e.g., a number of physical panels activate at the UEs 115), or both.

In some cases, a base station 105 in communication with a UE 115 may be unaware of the UE 115 operating in a UE cooperation mode and the corresponding changes in UE capabilities. The base station 105 may continue communicating with the UE 115 assuming the same UE capabilities are applied for each beam group used for communications with the UE 115, which may result in inefficient communications.

As described herein, the UEs 115 may be configured to report one or more levels of UE capabilities. The levels of UE capabilities may depend on the number of UEs 115 in cooperation, the number of physical panels 205 used by the UEs 115, the number of beam groups supported by the UEs 115, TCI states supported by the UEs 115, or a combination thereof. By reporting UE capability levels, a UE 115 may indicate updated UE capabilities to a base station 105, which may provide for the base station 105 to more accurately and efficiently communicate with the UE 115 during UE cooperation mode.

The base station 105 may receive the multiple UE capability levels and may communicate with the UEs 115 according to the reported UE capability levels. The base station 105 may indicate an activated capability level selected from the multiple reported UE capability levels, and the UE 115 may apply the activated capability level for communications with the base station 105. In some examples, the base station 105 may be unaware of the physical panels 205 used by the UE 115, or the number of devices in cooperation, and the base station 105 may assume a single panel is used for communications by the UE 115 according to the activated UE capability level. A UE 115 may thereby operate in a UE cooperation mode and maintain reliable and efficient communications with a base station 105 by reporting multiple supported UE capability levels.

Figure 3A:
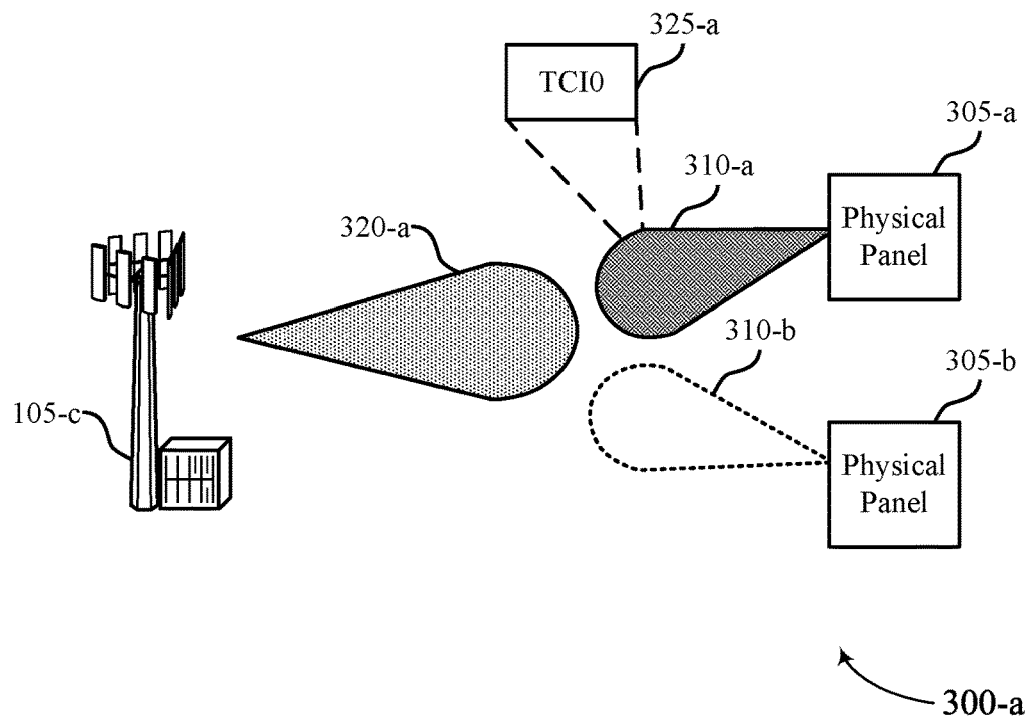
FIGS. 3A and 3B illustrate examples of wireless communications systems that support beam group UE capability in accordance with aspects of the present disclosure.
Figure 3B:
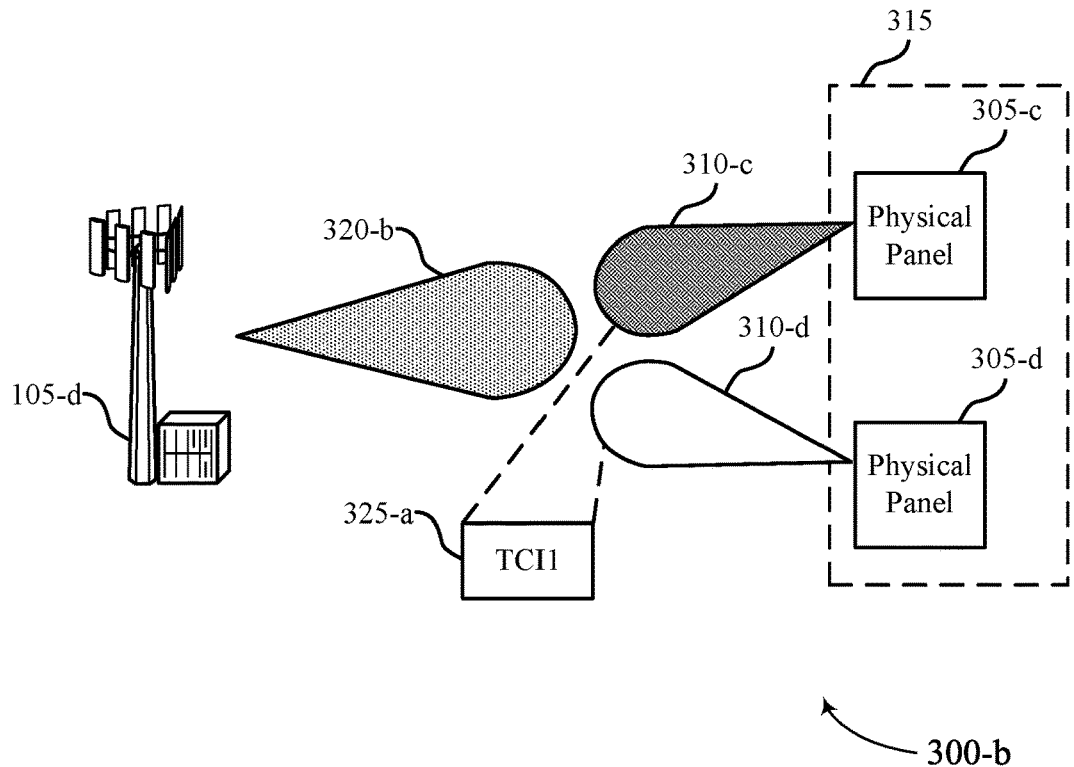

FIGS. 3A and 3B illustrate examples of wireless communications systems 300-a and 300-b that support beam group UE capability in accordance with aspects of the present disclosure. Wireless communications systems 300-a and 300-b may include base stations 105-c and 105-d, which may be examples of base stations 105 as described with reference to FIGS. 1 and 2. Wireless communications systems 300-a and 300-b may include physical panels 305-a, 305-b, 305-c, and 305-d, which may be examples of the physical panels 205 as described with reference to FIG. 2. The physical panels 305 may virtualize one or more beams 310, and the base stations 105 may communicate with the physical panels 305 using beams 320. The physical panels 305 may each be located at respective UEs 115, or the physical panels 305 may cooperate to form a virtual panel 315 (e.g., a cooperative panel that is virtualized across devices), as described with reference to FIG. 2. Levels of UE capabilities for the respective UEs 115 or virtual UEs 115 may be reported to the base stations 105 based on the cooperation between devices and panels.

FIG. 3A illustrates a wireless communications system 300-a. Wireless communications system 300-a may include physical panels 305-a and 305-b, which may be non-cooperative physical panels 305 (e.g., antenna panels at different devices that are not in cooperation mode). Physical panels 305-a and 305-b may virtualize beams 310-a and 310-b, respectively for communications with base station 105-c. In some examples, the physical panels 305 may virtualize multiple beams 310 (e.g., a beam group). Wireless communications system 300-a may illustrate an example of a first configured TCI state 325-a for a UE 115 (e.g., TCI0). The first TCI state 325-a may be configured for a first UE 115 that includes physical panel 305-a. The first TCI state 325-a may be associated with beam 310-a formed by physical panel 305-a. For example, the first TCI state 325-a may represent a first beam group and corresponding UE capability for the first UE 115 communicating using a single physical panel 305 at the UE 115. Base station 105-c may communicate with physical panels 305-a and 305-b and one or more other devices or panels using one or more beams 320-a.

Physical panels 305-a and 305-b may report levels of UE capabilities for respective UEs 115 to base station 105-c, as described with reference to FIG. 2. For example, physical panel 305-a may report one or more levels of UE capability for the first UE 115, and physical panel 305-b may be located on a second UE 115 and may report one or more levels of UE capability for the second UE 115. In some examples, the first UE 115 and the second UE 115 may be configured to support UE cooperation. Additionally or alternatively, the first UE 115 and the second UE 115 may not support UE cooperation.

The different levels of UE capability reported by the first UE 115 and the second UE 115 may be associated with different beam groups at the UEs 115. For example, physical panel 305-a may virtualize beam 310-a and one or more other beams 310 (not pictured). The beams 310 that are virtualized by physical panel 305-a may form a first beam group (e.g., corresponding to a first TCI state 325-a, TCI0). Physical panel 305-b may virtualize beam 310-b and one or more other beams 310 that may form a second beam group. Each beam group may be associated with a beam group ID.

Beam groups may be based on a number of the physical panels 305, a number of antenna ports, a TCI state list, or a combination thereof. For example, IDs for the beam IDs may be reused from a panel ID, a TCI state list ID, or both. In one example, each physical panel 305 is associated with at least one beam 310 (e.g., a beam group), and all the antenna ports of each physical panel 305 are associated with the same beam 310 (e.g., or beam group). In this case, a UE 115 may reuse a panel ID for a physical panel 305 to use for a beam group ID (e.g., an ID for the group of beams at a single panel 305). In another example, base station 105-c may configure each UE 115 with a TCI state list that may be associated with at least one beam 310. Each TCI state in the TCI state list may be associated with a same set of antenna ports at a UE 115 (e.g., each TCI state may be associated with a same physical panel 305). Thus, the beam group ID may be reused from the TCI state list ID.

In the example of wireless communications system 300-a, a panel ID for physical panel 305-a may be used for determining a beam group ID for the first UE 115 associated with panel 305-a, or a TCI state list ID associated with the first TCI state 325-a configured for the first UE 115 may be used for the beam group ID. The first UE 115 may transmit an indication of the beam group ID to base station 105-c, which may indicate a first level of UE capability (e.g., UE capability 1). The first level of UE capability may be applicable for physical panel 305-a at the first UE. The first level of UE capability may indicate a maximum number of MIMO transmission layers supported by the first UE, a minimum supported offset processing time, a minimum supported number of beam switches per slot, or a combination thereof.

In the example of wireless communications system 300-a, physical panel 305-a and physical panel 305-b may be non-cooperative panels 305. For example, the panels may receive and transmit signals independently of one another. As such, the first level of UE capability may be associated with UE capabilities at a single physical panel 305 (e.g., a single beam group). For example, physical panel 305-a may include a number of antenna ports (e.g., two antenna ports), and the first level of UE capability may indicate that the first UE supports a maximum number of MIMO transmission layers that is the same as or less than the number of antenna ports (e.g., two). In some examples, the first capability level may be applicable at physical panel 305-b (e.g., physical panels 305-a and 305-b may be independent physical panels 305 that may be associated with the same level of UE capability).

FIG. 3B illustrates a wireless communications system 300-b. Wireless communications system 300-b may include physical panels 305-c and 305-d, which may cooperate to form a virtual panel 315 (e.g., antenna panels at different devices in a cooperation mode). Physical panels 305-c and 305-d may virtualize beams 310-c and 310-d for communications with base station 105-d. In some examples, the physical panels 305 may virtualize multiple beams 310 (e.g., a beam group). Wireless communications system 300-b may illustrate an example of a second configured TCI state 325-b for a UE 115 (e.g., TCI1). The second TCI state 325-b may be configured for a first UE 115 that includes physical panel 305-c. The second TCI state 325-b may be associated with beam 310-c formed by physical panel 305-c and beam 310-d formed by physical panel 305-d. For example, the second TCI state 325-b may represent a second beam group and corresponding UE capability for the first UE 115 communicating using a virtualized panel 315 across one or more devices. Base station 105-d may communicate with physical panels 305-c and 305-d and one or more other devices or panels using one or more beams 320-b.

Physical panels 305-c and 305-d may be located on a single UE 115, or on different UEs 115, and may report levels of UE capabilities for respective UEs 115 to base station 105-d, as described with reference to FIGS. 2 and 3A. In one example, physical panels 305-c, 305-d, or both, may report levels of UE capabilities for a virtual UE 115 (e.g., one or more UEs 115 that cooperate to form the virtual panel 315).

The different levels of UE capability may be associated with different beam groups at the virtual panel 315, different configurations for virtual panels 315, or both. For example, the virtual panel 315 may virtualize beams 310-c, 310-d, and one or more other beams 310 (not pictured). The beams 310 that are virtualized by the virtual panel 315 may form a first beam group (e.g., associated with the second TCI state 325-b). In some examples (not pictured), a virtual panel 315 may include three physical panels 305, or some other number of physical panels 305. Each configuration for a virtual panel 315 may be associated with different beam groups accordingly, and each beam group may be associated with a beam group ID. The UE capabilities may be different for each beam group. For example, base station 105-d may communicate with the one or more UEs 115 according to different UE capabilities based on which beam group is applied.

As described with reference to FIG. 3A, the beam groups may be based on a number of the physical panels 305, a number of antenna ports, a TCI state list, or a combination thereof. For example, the beam group IDs may be reused from a panel ID, a TCI state list ID, or both. In the example of UE cooperation, a beam group may be formed for a virtual panel 315. In the example of wireless communications system 300-b, a panel ID for the virtual panel 315 may be used for determining a beam group ID for the respective virtual UE 115, or a TCI state list ID including the second TCI state 325-b configured for the virtual panel 315 may be used for the beam group ID. The virtual UE 115 may transmit an indication of the beam group ID for the virtual panel to base station 105-d, which may indicate a second level of UE capability (e.g., UE capability 2). The second level of UE capability may be applicable for the beam group associated with the virtual panel 315 including physical panel 305-c and physical panel 305-d. Other levels of UE capability may be reported and applicable for different beam groups associated with different configurations of virtual panels 315 including some other number of physical panels 305, antenna ports, or both (e.g., a third level of UE capability may be applicable for a virtual panel 315 including three physical panels 305, or the like). Each level of UE capability may indicate a maximum number of MIMO transmission layers supported by the first UE, a minimum supported offset processing time, a minimum supported number of beam switches per slot, or a combination thereof.

In the example of wireless communications system 300-b, physical panel 305-c and physical panel 305-d may include a number of antenna ports (e.g., each physical panel 305 may include two antenna ports), and the second level of UE capability may indicate that the beam group associated with the virtual panel 315 supports a maximum number of MIMO transmission layers that is the same as or less than twice the number of antenna ports (e.g., four).

Base station 105-d may receive the UE capability levels, and may configure communications to the virtual panel 315 according to the reported capability level for the virtual panel 315. For example, base station 105-d may transmit no more than the reported maximum supported number of MIMO transmission layers at the virtual panel 315.

By reporting levels of UE capabilities based on beam groups, UEs 115 may operate in a UE cooperation mode and may utilize antenna panels distributed across one or more devices. Further, more accurate capability information may be provided to a base station 105, which may achieve increased throughput, as well as more accurate and efficient communications.

Figure 4A:
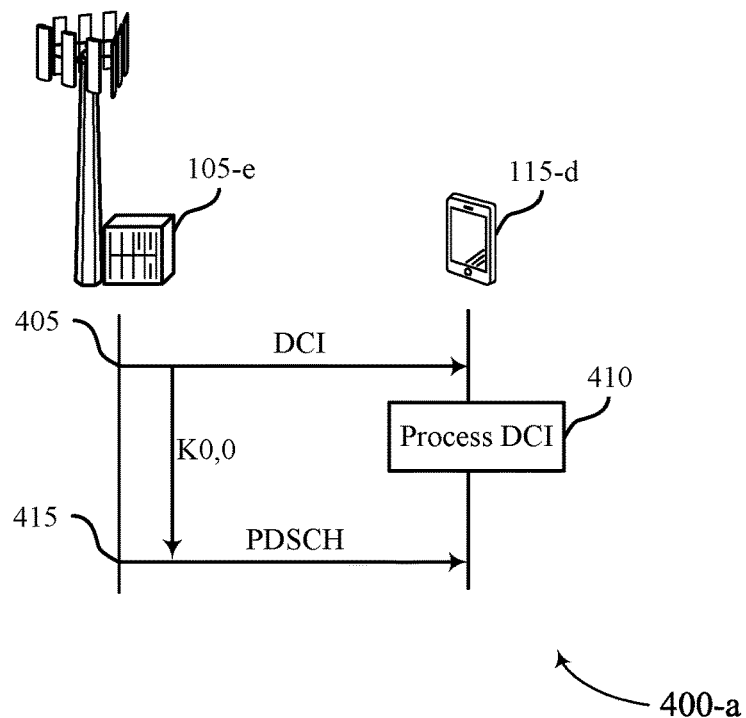
FIGS. 4A and 4B illustrate examples of process flows that support beam group UE capability in accordance with aspects of the present disclosure.
Figure 4B:
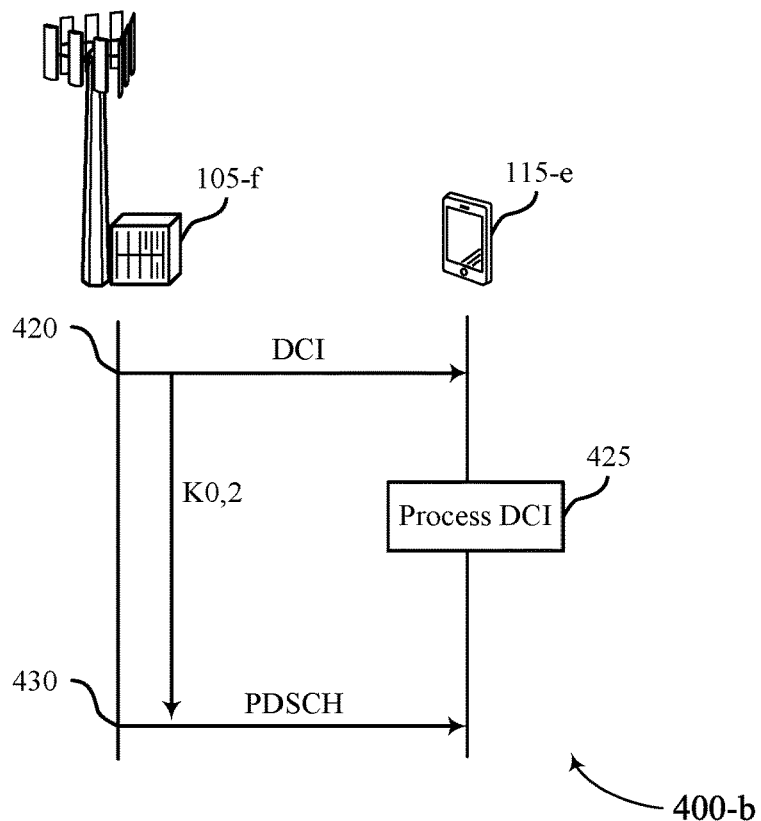

FIGS. 4A and 4B illustrate examples of process flows 400-a and 400-b that support beam group UE capability in accordance with aspects of the present disclosure. In some examples, process flows 400-a and 400-b may implement aspects of the wireless communications systems 100, 200, and 300 as depicted in the example of FIGS. 1 through 3. For example, process flows 400-a and 400-b may illustrate communications between a UE 115 and a base station 105, which may be examples of UEs 115 and base stations 105, as described with reference to FIGS. 1 through 3. UEs 115-e and 115-d may communicate using physical antenna panels, virtual antenna panels, or both, which may be examples of the physical panels 305 and the virtual panels 315 as described with reference to FIGS. 3A and 3B. In some examples, UE 115-d and 115-e may apply different processing times (e.g., K0,0 and K0,2) based on capability levels of the UEs 115.

In the following description of process flows 400-a and 400-b, the operations between the layers of the UE 115 and the base station 105 may be performed in different orders or at different times. Certain operations may also be left out of process flows 400-a and 400-b, or other operations may be added. It is to be understood that while two processing times are shown (e.g., K0,0 and K0,2) for two capability levels of a UE 115, any processing time may occur for any number of UE capability levels.

FIG. 4A illustrates a process flow 400-a for a first UE capability level and a first corresponding processing time supported by UE 115-d. UE 115-d may include one or more physical antenna panels, with may be examples of physical panels 305-a and 305-b as described with reference to FIG. 3A. UE 115-d may determine a first UE capability level based on a panel configuration at UE 115-d. For example, UE 115-d may include one physical antenna panel located at UE 115-d, and UE 115-d may support a corresponding beam group with a first level of capabilities. In the example of process flow 400-a, UE 115-d may support a first processing time, K0,0 (e.g., K0,0=1). UE 115-d may transmit an indication of the first capability level and corresponding supported processing time to base station 105-e, and base station 105-e may communicate with UE 115-d accordingly.

At 405, base station 105-e may transmit DCI to UE 115-d. Base station 105-e may transmit the DCI using a first beam, such as a beam 320-a as described with reference to FIG. 3A. The DCI may schedule resources for communications with UE 115-d. For example, the DCI may indicate resources reserved for transmissions to UE 115-d, or transmissions by UE 115-d. The DCI may indicate a beam for receiving data (e.g., downlink data received via a physical downlink shared channel (PDSCH)) at UE 115-d, such as beam 310-a as described with reference to FIG. 3A. Additionally or alternatively, the DCI may schedule a beam for transmissions (e.g., uplink data on a PUSCH) by UE 115-e.

At 410, UE 115-d may process the DCI during the first processing time (e.g., K0,0). UE 115-d may receive the DCI, decode the DCI, process the information conveyed via the DCI, and prepare for receiving data or transmitting data based on the DCI during the first processing time. The processing time may be a time gap (e.g., a number of slots, symbols, or some other TTIs) between receiving DCI and data scheduled by the DCI according to a beam group supported by UE 115-d. In the example of process flow 400-a, UE 115-d may be configured with a single antenna panel that may form a corresponding beam group, as described with reference to FIG. 3A. The minimum processing time supported by UE 115-d may thereby be associated with the beam group formed by a single panel at UE 115-d.

At 415, base station 105-e may transmit downlink data to UE 115-d (e.g., the downlink data scheduled by the DCI transmitted at 405). Base station 105-e may transmit the downlink data after the processing time (e.g., the minimum processing time, K0,0) supported by UE 115-d, as indicated in the reported UE capability level. UE 115-d may thereby indicate a capability of UE 115-d to process data, which may provide for base station 105-*e* to schedule data for UE 115-*d* according to an appropriate timeline and may increase throughput of communications at UE 115-*d*.

FIG. 4B illustrates a process flow 400-*b* for a UE capability level and a corresponding processing time supported by UE 115-*e*. Process flow 400-*b* may illustrate a similar procedure for processing DCI at a UE 115-*e*, but the UE capability level of UE 115-*e* and the minimum processing time supported by UE 115-*e* may be different from the capability level and the minimum processing time supported by UE 115-*f* in process flow 400-*a*.

UE 115-*e* may include one or more physical antenna panels and one or more virtual panels, which may be examples of physical panels 305-*c* and 305-*d* and the virtual panel 315 as described with reference to FIG. 3B. UE 115-*e* may determine a UE capability level based on the configuration of antenna panels at UE 115-*e* and a corresponding beam group formed by the panels. In the example of process flow 400-*b*, UE 115-*e* may support a processing time, K0,2 (e.g., K0,2=4). UE 115-*e* may transmit an indication of the capability level to base station 105-*f*, and base station 105-*f* may communicate with UE 115-*e* accordingly.

At 420, base station 105-*f* may transmit DCI to UE 115-*e*. The DCI may schedule resources for communications at UE 115-*e*, as described with reference to process flow 400-*a*.

At 425, UE 115-*e* may process the DCI during the second processing time (e.g., a minimum supported processing time, K0,2). UE 115-*d* may receive the DCI, decode the DCI, process the information conveyed via the DCI, and prepare for receiving data or transmitting data based on the DCI during the second processing time. The processing time may be a time gap (e.g., a number of slots, symbols, or some other TTIs) between receiving DCI and data scheduled by the DCI according to a beam group supported by UE 115-*e*.

In the example of process flow 400-*b*, UE 115-*e* may be configured with a virtual antenna panel (e.g., one or more physical antenna panels that may cooperate across devices) that may form corresponding beam group, as described with reference to FIG. 3B. The minimum processing time supported by UE 115-*d* may thereby be associated with the beam group formed by the virtual panel (e.g., a cooperative combination of a first panel and a second panel, or some other number of panels). In some examples, the processing time supported by UE 115-*e* may be greater than the processing time supported by UE 115-*d* (e.g., K0,2>K0,0) due to the cooperation between physical panels to form the virtual panel. For example, the virtual panel may include cooperative panels distributed across multiple devices, and UE 115-*e* and the one or more other devices may communicate (e.g., via sidelink communication links) to decode and process the received DCI and prepare for receiving the scheduled data at the virtual panel according to the DCI. Such inter-device communication may result in greater processing time at UE 115-*e* than at UE 115-*d*.

At 430, base station 105-*f* may transmit downlink data to UE 115-*e* (e.g., the downlink data scheduled by the DCI transmitted at 420). Base station 105-*f* may transmit the downlink data after the processing time (e.g., K0,2) supported by UE 115-*e*, as indicated in the reported UE capability level. UE 115-*e* may thereby indicate a capability of UE 115-*e* to process data, which may provide for base station 105-*f* to schedule data for UE 115-*e* according to an appropriate timeline and may increase throughput of communications at UE 115-*e*.

Figure 5A:
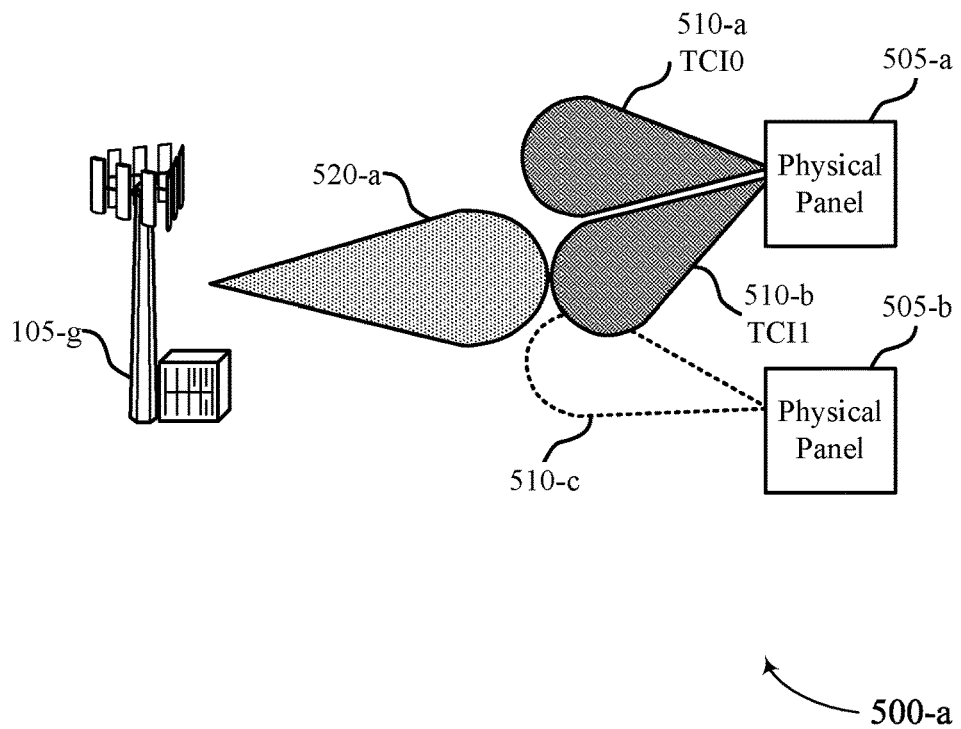
FIGS. 5A and 5B illustrate examples of wireless communications systems that support beam group UE capability in accordance with aspects of the present disclosure.
Figure 5B:
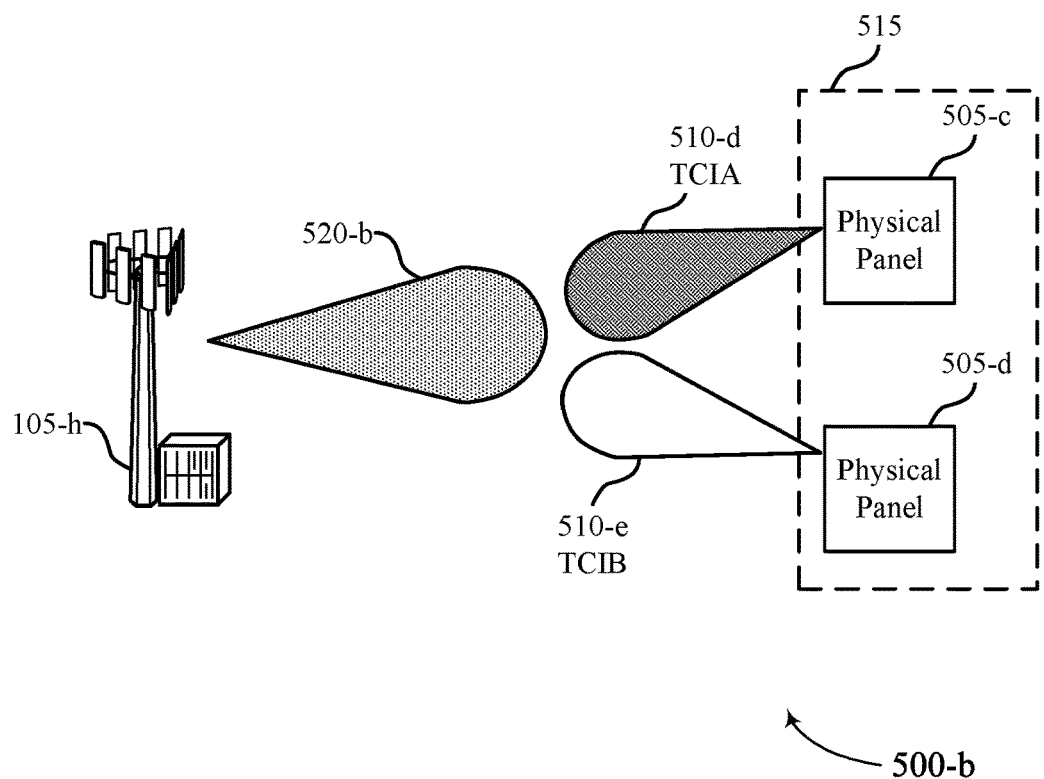

FIGS. 5A and 5B illustrate examples of wireless communications systems 500-*a* and 500-*b* that support beam group UE capability in accordance with aspects of the present disclosure. In some examples, wireless communications systems 500-*a* and 500-*b* may implement aspects of FIGS. 1 through 4. For example, wireless communications systems 500-*a* and 500-*b* may include base stations 105-*g* and 105-*h*, which may be examples of base stations 105 as described with reference to FIGS. 1 through 4. Wireless communications systems 500-*a* and 500-*b* may include physical panels 505-*a*, 505-*b*, 505-*c*, and 505-*d*, which may be examples of the physical panels 205 and 305 as described with reference to FIGS. 2 and 3. The physical panels 505 may form (e.g., virtualize) one or more beams 510, and the base stations 105 may communicate with the physical panels 505 using beams 520. The physical panels 505 may each be located at respective UEs 115, or the physical panels 505 may cooperate to form a virtual panel 515 (e.g., a cooperative panel), as described with reference to FIG. 3B. Levels of UE capabilities for the respective UEs 115 or virtual UEs 115 may be reported to the base stations 105, and may indicate a number of supported beam switches per slot.

FIG. 5A illustrates a wireless communications system 500-*a*. Wireless communications system 500-*a* may include physical panels 505-*a* and 505-*b*, which may be non-cooperative physical panels 505 (e.g., antenna panels at different devices that are not in cooperation mode). Physical panels 505-*a* may virtualize beams 510-*a* and 510-*b* (e.g., a beam group) for communications with base station 105-*g*. Physical panel 505-*b* may virtualize beam 510-*c* (and one or more other beams 510). Base station 105-*g* may communicate with physical panels 505-*a*, 505-*b*, and one or more other devices or panels using one or more beams 520-*a*.

Physical panels 505-*a* and 505-*b* may be located at first and second UEs 115, respectively, and may report levels of UE capabilities for the respective UEs 115 to base station 105-*g*, as described with reference to FIG. 3A. Each level of UE capability may indicate a supported number of beam switches per slot (e.g., per slot, per symbol, per time period, or some other TTI). The number of supported beam switches per slot may be based on whether the beam switches occur between beams 510 formed by the same panel 505 (e.g., intra-panel switching), a radio frequency (RF) switching time at the device, or both. In the example of wireless communications system 500-*a*, the first UE 115 may report a first UE capability level (e.g., UE capability 1) associated with a beam group formed by single physical panel 505-*a* (e.g., because the physical panels 505 may not be in cooperation mode).

The first UE 115 may determine a number of beam switches per slot that the UE 115 can support in the first capability level based on one or more panel assumptions. In a first assumption (e.g., panel assumption A), the first UE 115 may assume that intra-panel switching is faster than inter-panel switching because inter-panel switching may include a delay for activating respective panels. In a second assumption (e.g., panel assumption B), the first UE 115 may assume that intra-panel switching is slower than inter-panel switching due to a RF switching time (e.g., a time to stop communications on one beam 510 and start communications on the other beam 510 formed by the same physical panel 505).

In the example of wireless communications system 500-*a*, beam switching at physical panels 505-*a* and 505-*b* may be intra-panel switching because physical panels 505-*a* and 505-*b* may be located at respective first and second UEs 115, and may not cooperate across devices. A first UE 115 that includes physical panel 505-*a* may switch between beam 510-*a*, associated with TCI state TCI0, and beam 510-*b*, associated with TCI state TCI1 (and one or more other beams 510) formed by physical panel 505-*a*.

In the example of panel assumption A, the first UE 115 may assume that intra-panel switching is associated with relatively small delays. For example, the first UE 115 may switch between beams 510-*a* and 510-*b* by indicating TCI0 and TCI1 in a slot, respectively. The first UE 115 may report a first number of supported beam switches per slot accordingly (e.g., UE capability 1 may support a maximum number of two beam switches per slot, or some other number of beam switches per slot). In the example of panel assumption B, the first UE 115 may assume that intra-panel may be associated with a time gap for RF switching. The RF switching time may be a time for the first UE 115 to activate a physical panel 505 and corresponding beam 510. For example, if the first UE 115 communicates using beam 510-*a* formed by physical panel 505-*a* and switches to using beam 510-*b* formed by physical panel 505-*b* for communications, the first UE may activate panel 505-*b*, which may occur during the RF switching gap before the switch. In this example, the first UE 115 may report a second number of supported beam switches per slot that may be less than the first number of supported beam switches per slot under panel assumption A (e.g., UE capability 1 may support a maximum number of one beam switch per slot, or some other number of beam switches per slot).

FIG. 5B illustrates a wireless communications system 500-*b*. Wireless communications system 500-*b* may include physical panels 505-*c* and 505-*d*, which may cooperate to form a virtual panel 515 (e.g., antenna panels at different devices in cooperation mode), as described with reference to FIG. 3B. Physical panels 505-*c* and 505-*d* may form (e.g., virtualize) beams 510-*d* (e.g., TCI state TCIA) and 510-*e* (e.g., TCI state TCIB) for communications with base station 105-*h*. In some examples, the physical panels 305 may virtualize multiple beams 510. Base station 105-*h* may communicate with physical panels 505-*c*, 505-*d*, and one or more other devices or panels using one or more beams 520-*b*.

Physical panels 505-*c* and 505-*d* may be located on a single UE 115, or on different UEs 115, and may report levels of UE capabilities for respective UEs 115 to base station 105-*g*, as described with reference to FIGS. 3A and 3B. In one example, physical panels 505-*c*, 505-*d*, or both, may report levels of UE capabilities for a virtual UE 115 (e.g., one or more UEs 115 that cooperate to form the virtual panel 515).

The different levels of UE capability may be associated with different beam groups at the virtual panel 515, different configurations for virtual panels 515, or both. For example, the virtual panel 515 may virtualize beams 510-*d*, 510-*e*, and one or more other beams 510 (not pictured). The beams 510 that are virtualized by the virtual panel 515 may form a beam group. Each beam group may be associated with a different UE capability level. Each level of UE capability may indicate a supported number of beam switches per slot. The number of supported beam switches per slot may be based on whether the beam switches occur between beams 510 formed by the same panel 505 (e.g., intra-panel switching), a RF switching time at the device, or both.

In the example of wireless communications system 500-*b*, a first UE 115 associated with the virtual panel 515 (e.g., the UE 115 that formed or virtualized the virtual panel 515) may report a second level of UE capability (e.g., UE capability 2) based on the cooperation of physical panels 505-*c* and 505-*d* to form the virtual panel 515 and the corresponding beam group formed by the virtual panel 515.

The first UE 115 may determine a number of beam switches per slot that the first UE 115 can support in the second UE capability level based panel assumption A (e.g., a UE 115 may assume that intra-panel switching is faster than inter-panel switching) or panel assumption B (e.g., a UE 115 may assume that intra-panel switching is slower than inter-panel switching), as described with reference to FIG. 5A.

In the example of wireless communications system 500-*b*, beam switching at physical panels 505-*c* and 505-*d* may be inter-panel switching because physical panels 505-*c* and 505-*d* may cooperate to form the virtual panel 515. The virtual panel 515 may form a beam group including beams 510-*d*, 510-*e*, and one or more other beams 510, and switching between the beams 510 may include switching between physical panels 505. Beam 510-*d* may be associated with a first TCI state for the virtual UE 115 (e.g., TCIA) and beam 510-*e* may be associated with a second TCI state for the virtual UE 115 (e.g., TCIB).

In the example of panel assumption A, the first UE 115 may assume that inter-panel switching is associated with a time gap for beam activation. For example, the first UE 115 may assume that switching from beam 510-*d* to beam 510-*e* may be associated with a time gap for activating beam 510-*e* (e.g., beam 510-*e* may not always be ready). The first UE 115 may report a first number of supported beam switches per slot accordingly (e.g., UE capability 2 may support a maximum number of one beam switch per slot, or some other number of beam switches per slot). In the example of panel assumption B, the first UE 115 may assume that inter-panel switching may be associated with relatively small delays. If the first UE 115 switches from beam 510-*d* to beam 510-*e*, there may be a relatively small RF switching delay (e.g., or no delay), because beam 510-*e* may be ready for communications (e.g., while physical panel 505-*c* communicates using beam 510-*d*, physical panel 505-*d* may prepare beam 510-*e* for communications). In this example, the first UE 115 may report a second number of supported beam switches per slot that may be greater than the first number of supported beam switches per slot under panel assumption A (e.g., UE capability 2 may support a maximum number of two beam switches per slot, or some other number of beam switches per slot).

Figure 6:
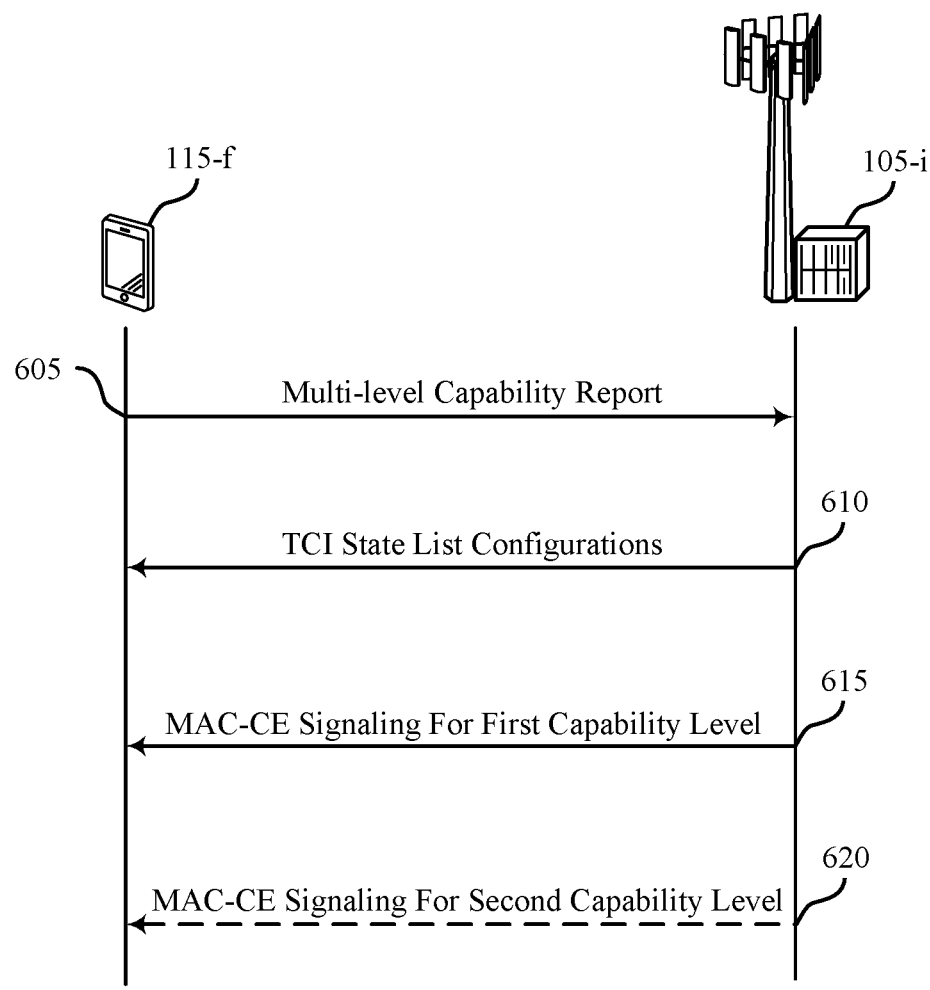
FIG. 6 illustrates an example of a process flow that supports beam group UE capability in accordance with aspects of the present disclosure.

FIG. 6 illustrates an example of a process flow 600 that supports beam group UE capability in accordance with aspects of the present disclosure. In some examples, the process flow 600 may implement aspects of FIGS. 1 through 5. For example, process flow 600 may illustrate communications between a UE 115-*f* and a base station 105-*i*, which may be examples of a UE 115 and a base station 105 as described with reference to FIGS. 1 through 5. UE 115-*f* may be configured to support a UE cooperation mode, and may include one or more physical antenna panels, virtual antenna panels, or both. In some examples, UE 115-*f* may report levels of UE capabilities supported by UE 115-*f* to base station 105-*i*, and base station 105-*i* may transmit signaling indicating a capability level to be used by UE 115-*f*.

In the following description of process flow 600, the operations between UE 115-*f* and base station 105-*i* may be performed in different orders or at different times. Certain operations may also be left out of process flow 600, or other operations may be added. It is to be understood that while UE 115-*f* and base station 105-*i* are shown performing a number of the operations of process flows 600, any wireless device may perform the operations shown on any cells and in any order. In some examples, base station 105-*i* may transmit MAC-CE signaling (e.g., or some other type of signaling) to indicate any number of capability levels for UE 115-*f*.

At 605, UE 115-*f* may transmit a multi-level capability report to base station 105-*i*. The multi-level capability report may indicate different levels of capabilities supported by UE 115-*f* for different beam groups formed by UE 115-*f*, as described with reference to FIGS. 1 through 5. The beam groups may be associated with different TCI states configured for UE 115-*f*, different panels associated with UE 115-*f*, different numbers of antenna ports at UE 115-*f*, or a combination thereof.

At 610, base station 105-*i* may transmit a TCI state list configuration (e.g., a multi-TCI state list configuration) to UE 115-*f* In some examples, the TCI state list configuration bay be transmitted via RRC signaling. Additionally or alternatively, the TCI state list configuration may be transmitted via DCI. The TCI state list configuration may include some number of TCI state lists for UE 115-*f* (e.g., list 1 and list 2, or some other number of TCI state lists). The TCI state lists may configure UE 115-*f* with one or more TCI states, and each TCI state list may be associated with different UE capability levels.

At 615, base station 105-*i* may transmit MAC-CE signaling indicating a first UE capability level for UE 115-*f*. In one example, a MAC-CE may be configured to indicate (e.g., activate) a UE capability level. In another example, the MAC-CE signaling may activate a first beam group ID associated with the first UE capability level to indicate the first capability level. As described with reference to FIG. 2, the beam group ID may be associated with a first TCI state list ID (e.g., an ID of TCI state list 1), or a related panel ID, which may indicate the first capability level. UE 115-*f* may activate the first capability level based on receiving the MAC-CE signaling. In some examples, UE 115-*f*, base station 105-*i*, or both, may apply the activated capability level after a time offset (e.g., a configured time offset, X). The time offset may be a time period after UE 115-*f* receives the MAC-CE signaling during which UE 115-*f* may transmit an acknowledgement message for the MAC-CE (e.g., a PDSCH carrying the MAC-CE). The time offset may be a number of symbols, slots, seconds, or some other TTI (e.g., X may be 28 OFDM symbols, 3 ms, or some other duration).

At 620, in some examples, base station 105-*i* may transmit MAC-CE signaling indicating a second capability level for UE 115-*f*. Base station 105-*i* may transmit the MAC-CE signaling indicating the second capability level for UE 115-*f* some time after indicating the first capability level for UE 115-*f*. For example, base station 105-*i* and UE 115-*f* may communicate using the first UE capability level for a time period, and base station 105-*i* may determine to switch beam groups (e.g., and corresponding capability levels). The MAC-CE signaling may include a CE configured to indicate the second UE capability level, or the MAC-CE signaling may activate a second beam group associated with the second UE capability level. By transmitting the MAC-CE signaling, base station 105-*i* may indicate capability levels (e.g., and corresponding beam groups) for UE 115-*f* to use for communications.

Figure 7:
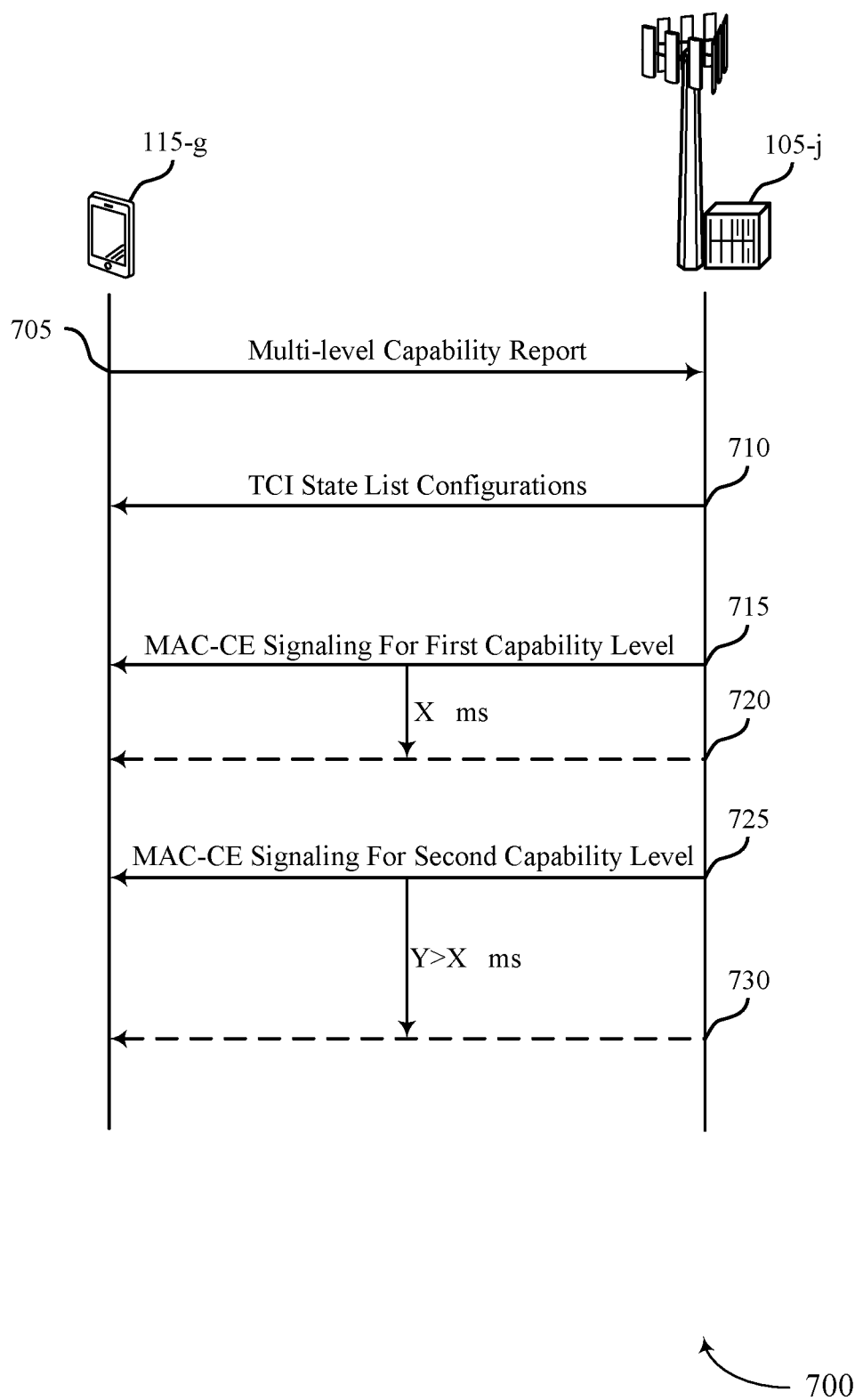
FIG. 7 illustrates an example of a process flow that supports beam group UE capability in accordance with aspects of the present disclosure.

FIG. 7 illustrates an example of a process flow 700 that supports beam group UE capability in accordance with aspects of the present disclosure. In some examples, the process flow 700 may implement aspects of FIGS. 1 through 6. For example, the process flow 700 may illustrate communications between a UE 115-*g* and a base station 105-*j*, which may be examples of a UE 115 and a base station 105 as described with reference to FIGS. 1 through 6. UE 115-*g* may be configured to support a UE cooperation mode, and may include one or more physical antenna panels, virtual antenna panels, or both. In some examples, base station 105-*j* may transmit signaling indicating a capability level to be used by UE 115-*g*, and the indicated capability level may be activated after an activation time period.

In the following description of the process flow 700, the operations between UE 115-*g* and base station 105-*j* may be performed in different orders or at different times. Certain operations may also be left out of the process flow 700, or other operations may be added. It is to be understood that while UE 115-*g* and base station 105-*j* are shown performing a number of the operations of process flow 700, any wireless device may perform the operations shown on any cells and in any order. In some examples, base station 105-*j* may transmit MAC-CE signaling (e.g., or some other type of signaling) to indicate any number of capability levels for UE 115-*g*.

At 705, UE 115-*g* may transmit a multi-level capability report to base station 105-*j*. The multi-level capability report may indicate different levels of capabilities supported by UE 115-*g* for different beam groups formed by UE 115-*g*.

At 710, base station 105-*j* may transmit a TCI state list configuration (e.g., a multi-TCI state list configuration) to UE 115-*g*. In some examples, the TCI state list configuration bay be transmitted via RRC signaling. Additionally or alternatively, the TCI state list configuration may be transmitted via DCI. The TCI state list configuration may include some number of TCI state lists for UE 115-*g* (e.g., list 1 and list 2, or some other number of TCI state lists). The TCI state lists may configure UE 115-*g* with one or more TCI states, and each TCI state list may be associated with different UE capability levels.

At 715, base station 105-*j* may transmit MAC-CE signaling indicating a first UE capability level for UE 115-*g*. Base station 105-*j* and UE 115-*g* may prepare for communications according to the first UE capability level during a first activation time period, X. In some examples, the activation time period (e.g., X ms) may be based on a beam group associated with the first UE capability level (e.g., a beam group specific application time period, or a TCI state list specific activation time period). In some cases, UE 115-*f* may be associated with an offset time for applying a RRC configuration or reconfiguration (e.g., RRC uncertain time). UE 115-*f* may receive the MAC-CE signaling (e.g., via RRC) at 715 and may prepare the corresponding RRC configuration. The application offset time for preparing the RRC configuration at UE 115-*f* may be different for different beam groups and corresponding UE capability levels.

At 720, base station 105-*j* and UE 115-*g* may communicate according to the activated first UE capability level after preparing to apply the activated second UE capability level during the activation time period, X, prior to 720.

At 725, base station 105-*j* may transmit MAC-CE signaling indicating a second capability level for UE 115-*g*. Base station 105-*j* may transmit the MAC-CE signaling indicating the second capability level for UE 115-*g* some time after indicating the first capability level for UE 115-*g*. For example, base station 105-*j* and UE 115-*g* may communicate using the first UE capability level for a time period, and base station 105-*j* may determine to switch beam groups (e.g., and corresponding capability levels) at 725.

Base station 105-*j* and UE 115-*g* may prepare for communications according to the second UE capability level during a second activation time period, Y. The second activation time period (e.g., Y ms) may be based on a beam group associated with the second UE capability level (e.g., a beam group specific application time period, or a TCI state list specific activation time period). In some examples, the second activation time period may be greater than the first activation time period (e.g., Y>X). For example, the beam group associated with the second capability level may be associated with a longer processing time.

At 730, base station 105-*j* and UE 115-*g* may communicate according to the activated second UE capability level after preparing to apply the activated second UE capability level during the activation time period, Y, prior to 720.

Figure 8:
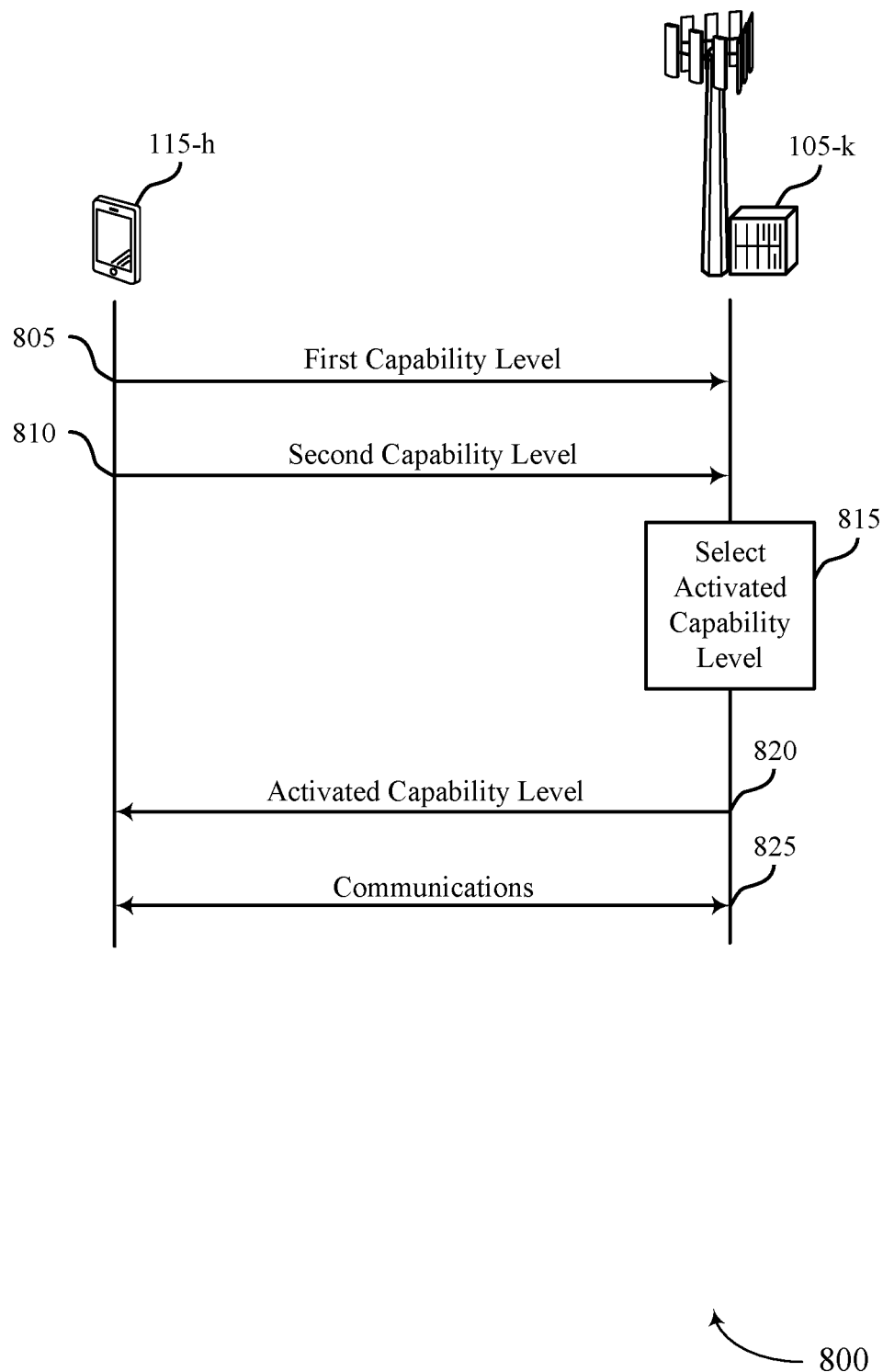
FIG. 8 illustrates an example of a process flow that supports beam group UE capability in accordance with aspects of the present disclosure.

FIG. 8 illustrates an example of a process flow 800 that supports beam group UE capability in accordance with aspects of the present disclosure. In some examples, the process flow 800 may implement aspects of FIGS. 1 through 7. For example, the process flow 800 may illustrate communications between a UE 115-*h* and a base station 105-*k*, which may be examples of a UE 115 and a base station 105 as described with reference to FIGS. 1 through 7. UE 115-*h* may be configured to support a UE cooperation mode, and may include one or more physical antenna panels, virtual antenna panels, or both. In some examples, UE 115-*h* may report levels of UE capabilities to base station 105-*k*, and base station 105-*k* may indicate an activated UE capability level for communications.

In the following description of the process flow 800, the operations between UE 115-*h* and base station 105-*k* may be performed in different orders or at different times. Certain operations may also be left out of the process flow 800, or other operations may be added. It is to be understood that while UE 115-*h* and base station 105-*k* are shown performing a number of the operations of process flow 800, any wireless device may perform the operations shown on any cells and in any order.

At 805, UE 115-*h* may transmit a first indication of a first capability level supported by UE 115-*h* to base station 105-*k*. The first capability level may correspond to a first beam group. UE 115-*h* may be configured to operate in UE cooperation mode, and each beam group may be associated with a respective set of antenna components at UE 115-*h*, or distributed across UE 115-*h* and one or more other devices. In some examples, the beam group may be associated with a respective panel of antenna ports at UE 115-*h*, a TCI state list configured for UE 115-*h*, or both.

At 810, UE 115-*h* may transmit a second indication of a second capability level supported by UE 115-*h* to base station 105-*k*. The second capability level may correspond to a second beam group. In some examples, the beam group may be associated with a respective panel of antenna ports at UE 115-*h*, a TCI state list configured for UE 115-*h*, or both.

At 815, base station 105-*k* may select an activated capability level for UE 115-*h*. Base station 105-*k* may select the activated capability from the first capability level and the second capability level reported by UE 115-*h*.

At 820, base station 105-*k* may transmit signaling indicating the activated capability level to UE 115-*h*. In some examples, base station 105-*k* may transmit MAC-CE signaling to indicate the activated capability level. The MAC-CE signaling may include a CE to indicate the activated capability level, or the MAC-CE signaling may activate a related panel ID or TCI state list ID to indicate the corresponding activated capability level.

At 825, UE 115-*h* and base station 105-*k* may communicate according to the activated capability level. Communicating according to the activated capability level may include communicating using the corresponding beam group and respective set of antenna components that are associated with the activated capability level. In some examples, UE 115-*h* may apply the activated capability level during an activation time period. The activation time period may depend on the activated capability level.

Figure 9:
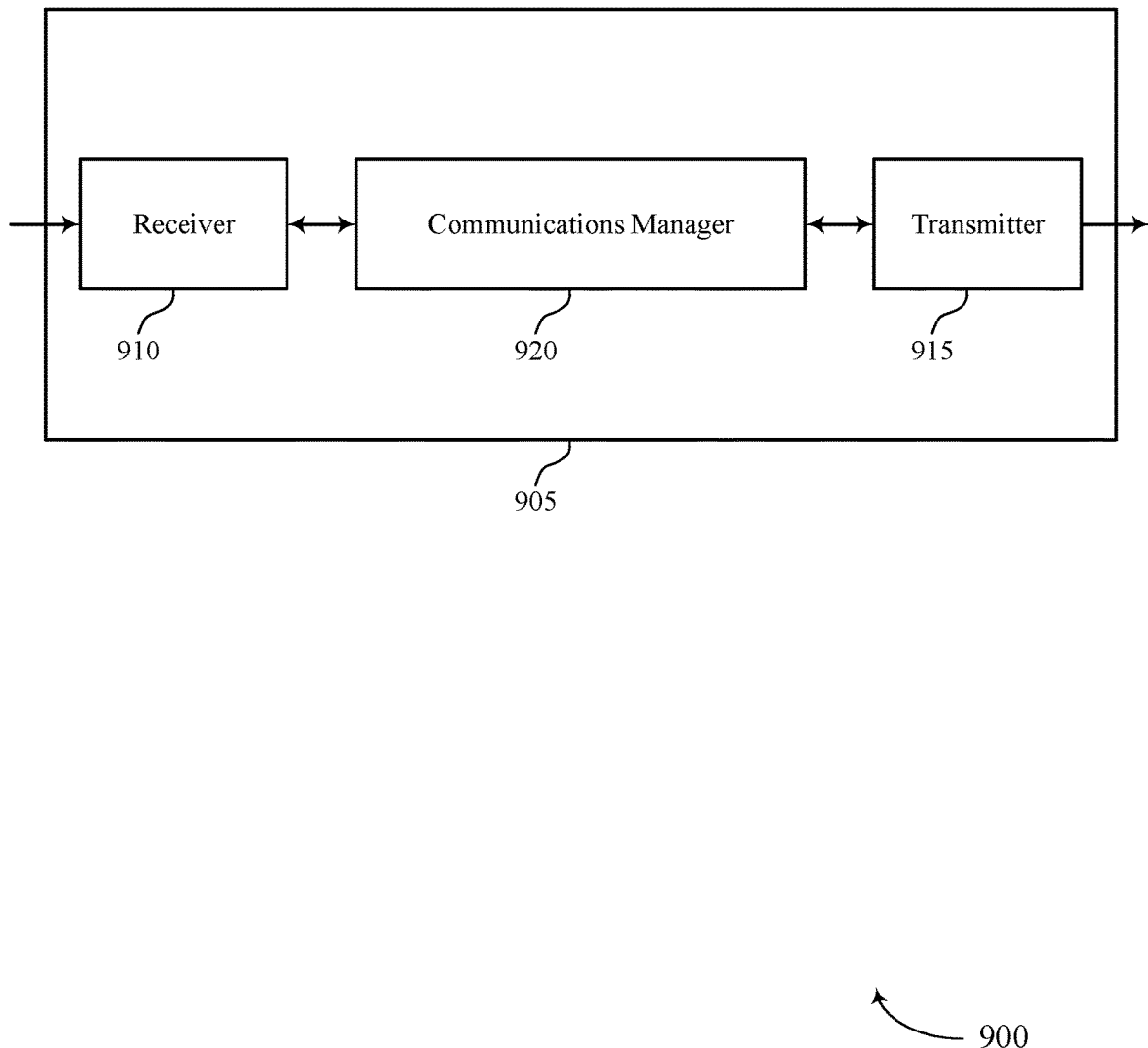
FIGS. 9 and 10 show block diagrams of devices that support beam group UE capability in accordance with aspects of the present disclosure.

FIG. 9 shows a block diagram 900 of a device 905 that supports beam group UE capability in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to beam group UE capability). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to beam group UE capability). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of beam group UE capability as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for transmitting, to a base station, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. The communications manager 920 may be configured as or otherwise support a means for transmitting, to the base station, a second indication of a second capability level of the UE, the second capability level corresponding to a second beam group of the set of multiple beam groups. The communications manager 920 may be configured as or otherwise support a means for receiving signaling that indicates an activated capability level for the UE, where the activated capability level is one of the first capability level or the second capability level. The communications manager 920 may be configured as or otherwise support a means for communicating with the base station based on the activated capability level using a corresponding beam group and the respective set of antenna components.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improved communication reliability, reduced power consumption, and improved coordination between devices. For example, by operating in UE cooperation mode, the device 905 (e.g., a UE 115) may utilize TRPs across multiple devices, which may reduce power consumption at the device 905 and improve reliability of communications by the device 905. Additionally or alternatively, by indicating multiple UE capability levels to a base station, the device 905 may improve coordination between the base station and the device 905, which may improve throughput and quality of communications. The device 905 may utilize different physical or virtual panel configurations for communications while maintaining coordination between devices, which may improve communication reliability and quality of communications.

Figure 10:
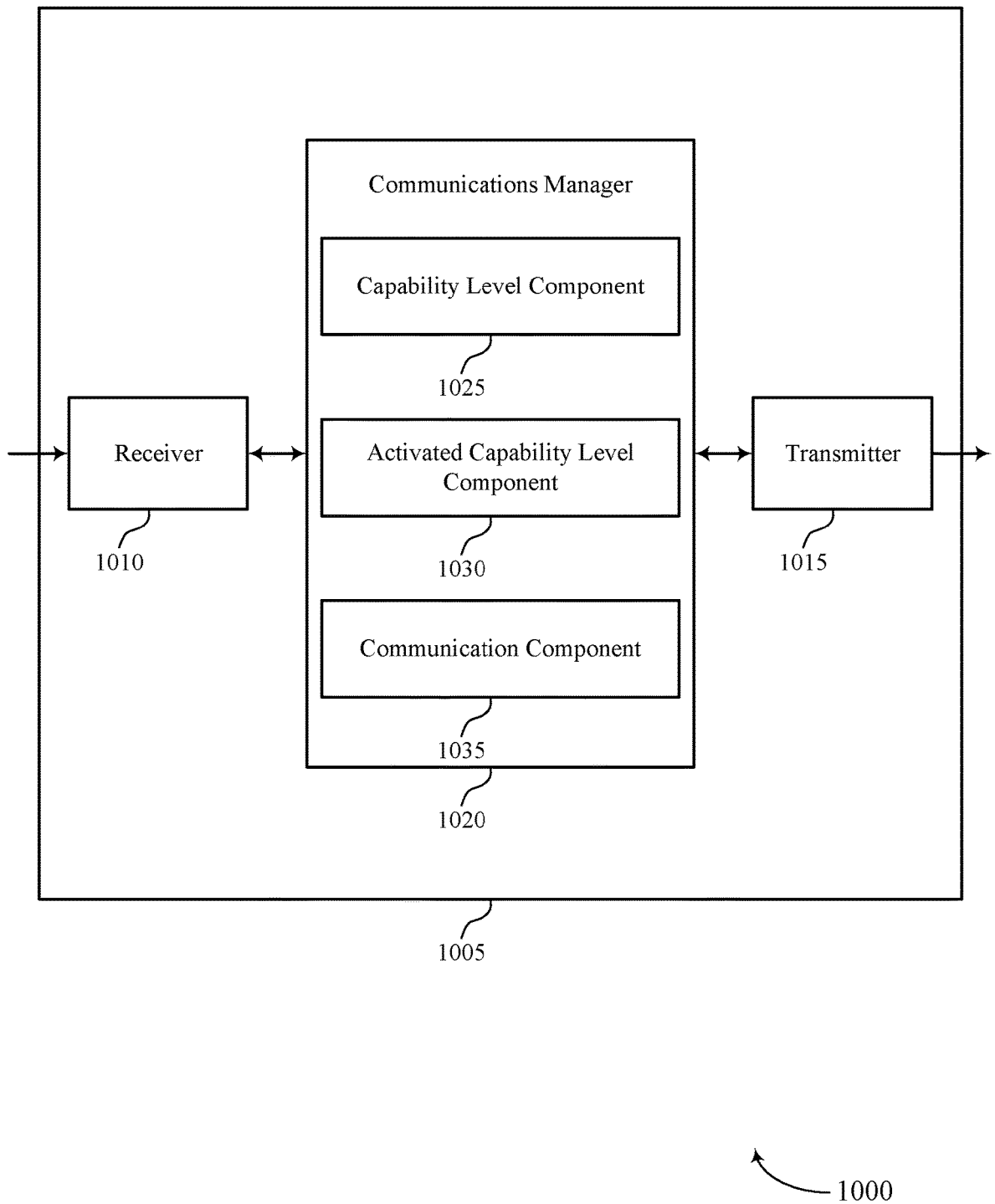

FIG. 10 shows a block diagram 1000 of a device 1005 that supports beam group UE capability in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to beam group UE capability). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to beam group UE capability). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of beam group UE capability as described herein. For example, the communications manager 1020 may include a capability level component 1025, an activated capability level component 1030, a communication component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. The capability level component 1025 may be configured as or otherwise support a means for transmitting, to a base station, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. The capability level component 1025 may be configured as or otherwise support a means for transmitting, to the base station, a second indication of a second capability level of the UE, the second capability level corresponding to a second beam group of the set of multiple beam groups. The activated capability level component 1030 may be configured as or otherwise support a means for receiving signaling that indicates an activated capability level for the UE, where the activated capability level is one of the first capability level or the second capability level. The communication component 1035 may be configured as or otherwise support a means for communicating with the base station based on the activated capability level using a corresponding beam group and the respective set of antenna components.

Figure 11:
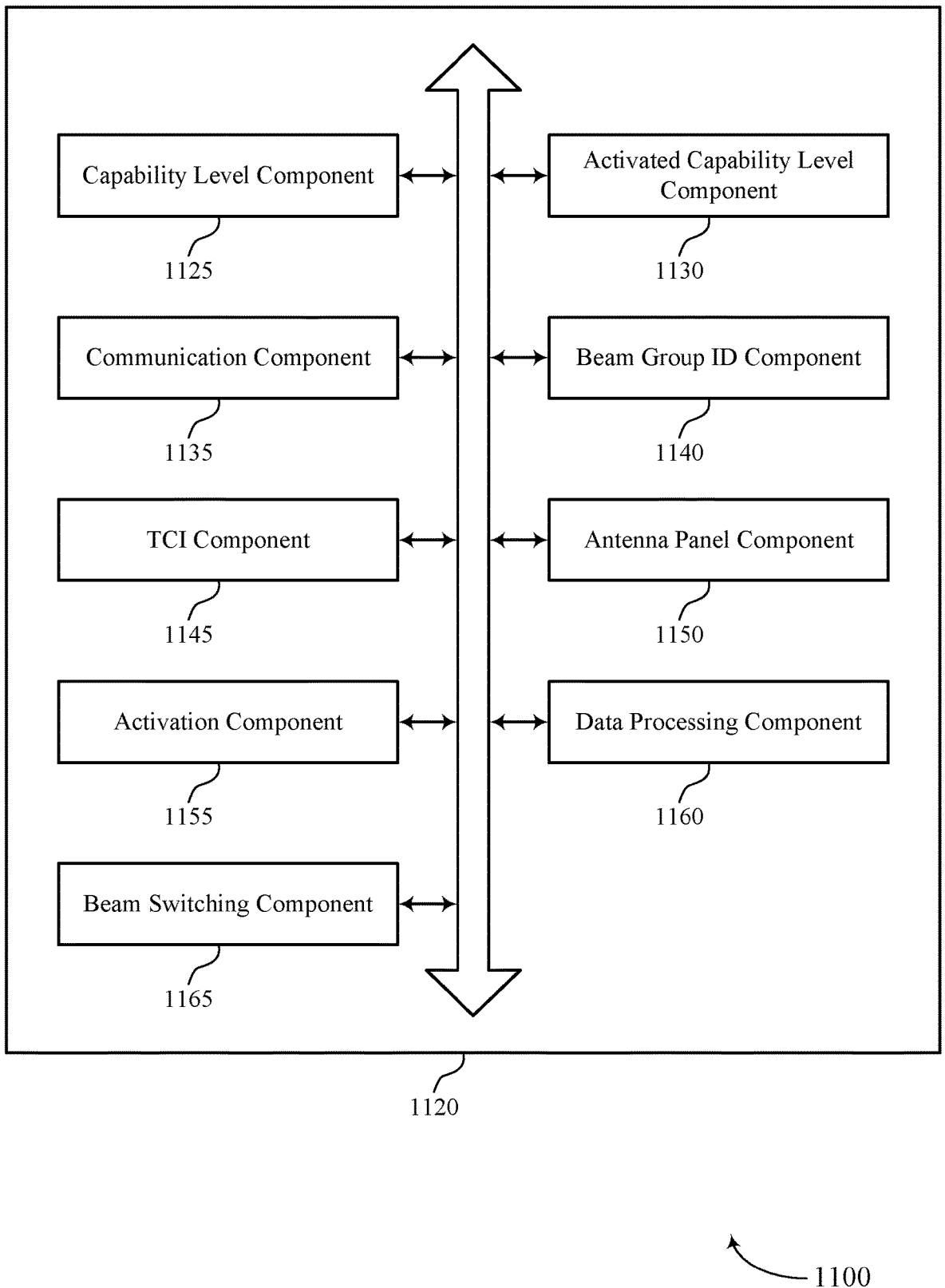
FIG. 11 shows a block diagram of a communications manager that supports beam group UE capability in accordance with aspects of the present disclosure.

FIG. 11 shows a block diagram 1100 of a communications manager 1120 that supports beam group UE capability in accordance with aspects of the present disclosure. The communications manager 1120 may be an example of aspects of a communications manager 920, a communications manager 1020, or both, as described herein. The communications manager 1120, or various components thereof, may be an example of means for performing various aspects of beam group UE capability as described herein. For example, the communications manager 1120 may include a capability level component 1125, an activated capability level component 1130, a communication component 1135, a beam group ID component 1140, a TCI component 1145, an antenna panel component 1150, an activation component 1155, a data processing component 1160, a beam switching component 1165, or any combination thereof. Each of these components may communicate, directly or indirectly, with one another (e.g., via one or more buses).

The communications manager 1120 may support wireless communications at a UE in accordance with examples as disclosed herein. The capability level component 1125 may be configured as or otherwise support a means for transmitting, to a base station, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. In some examples, the capability level component 1125 may be configured as or otherwise support a means for transmitting, to the base station, a second indication of a second capability level of the UE, the second capability level corresponding to a second beam group of the set of multiple beam groups. The activated capability level component 1130 may be configured as or otherwise support a means for receiving signaling that indicates an activated capability level for the UE, where the activated capability level is one of the first capability level or the second capability level. The communication component 1135 may be configured as or otherwise support a means for communicating with the base station based on the activated capability level using a corresponding beam group and the respective set of antenna components.

In some examples, the beam group ID component 1140 may be configured as or otherwise support a means for determining a first beam group ID for the first beam group based on a first panel ID for a first antenna panel supported by the UE, the first antenna panel including a first set of antenna components associated with a first number of antenna ports, where the first indication includes the first beam group ID. In some examples, the beam group ID component 1140 may be configured as or otherwise support a means for determining a second beam group ID for the second beam group based on a second panel ID for a second antenna panel supported by the UE, the second antenna panel includes a second set of antenna components associated with a second number of antenna ports, where the second indication includes the second beam group ID.

In some examples, the TCI component 1145 may be configured as or otherwise support a means for receiving, from the base station, a first configuration for a first TCI list, the first TCI list including a first set of multiple transmission configuration states for the UE, where the first TCI list is associated with the first beam group. In some examples, the TCI component 1145 may be configured as or otherwise support a means for receiving, from the base station, a second configuration for a second TCI list, the second TCI list including a second set of multiple transmission configuration states for the UE, where the second TCI list is associated with the second beam group.

In some examples, the beam group ID component 1140 may be configured as or otherwise support a means for determining a first beam group ID for the first beam group based on a first ID for the first TCI list, where the first indication includes the first beam group ID. In some examples, the beam group ID component 1140 may be configured as or otherwise support a means for determining a second beam group ID for the second beam group based on a second ID for the second TCI list, where the second indication includes the second beam group ID.

In some examples, the antenna panel component 1150 may be configured as or otherwise support a means for determining a first antenna panel supported by the UE, where the first antenna panel is a physical antenna panel at the UE and the first indication indicates the first antenna panel. In some examples, the antenna panel component 1150 may be configured as or otherwise support a means for determining a second antenna panel supported by the UE, where the second antenna panel is a virtualized antenna panel including at least a second physical antenna panel at another device and the second indication indicates the second antenna panel.

In some examples, the activation component 1155 may be configured as or otherwise support a means for applying the activated capability level after an activation time period, where the first beam group is associated with a first activation time period and the second beam group is associated with a second activation time period.

In some examples, the capability level component 1125 may be configured as or otherwise support a means for determining the first capability level of the UE based on a first number of MIMO transmission layers supported by the UE for the first beam group, where the first number of MIMO transmission layers supported by the UE is based on a first number of antenna ports. In some examples, the capability level component 1125 may be configured as or otherwise support a means for determining the second capability level of the UE based on a second number of MIMO transmission layers supported by the UE for the second beam group, where the second number of MIMO transmission layers supported by the UE is based on a second number of antenna ports.

In some examples, the data processing component 1160 may be configured as or otherwise support a means for determining the first capability level of the UE based on a first processing time supported by the UE, where the first processing time is a first time gap between receiving DCI and data scheduled by the DCI for the UE according to the first beam group. In some examples, the data processing component 1160 may be configured as or otherwise support a means for determining the second capability level of the UE based on a second processing time supported by the UE, where the second processing time is a second time gap between receiving DCI and data scheduled by the DCI for the UE according to the second beam group.

In some examples, the beam switching component 1165 may be configured as or otherwise support a means for determining the first capability level of the UE based on a first number of beam switches per slot supported by the UE. In some examples, the beam switching component 1165 may be configured as or otherwise support a means for determining the second capability level of the UE based on a second number of beam switches per slot supported by the UE.

In some examples, the first number of beam switches per slot and the second number of beam switches per slot supported by the UE are based on a radio frequency switching time, a configuration between antenna panels at the UE, or both.

In some examples, to support receiving the signaling, the activated capability level component 1130 may be configured as or otherwise support a means for receiving a MAC-CE indicating the activated capability level, where the MAC-CE indicates an antenna panel ID or a TCI state list ID associated with the activated capability level.

Figure 12:
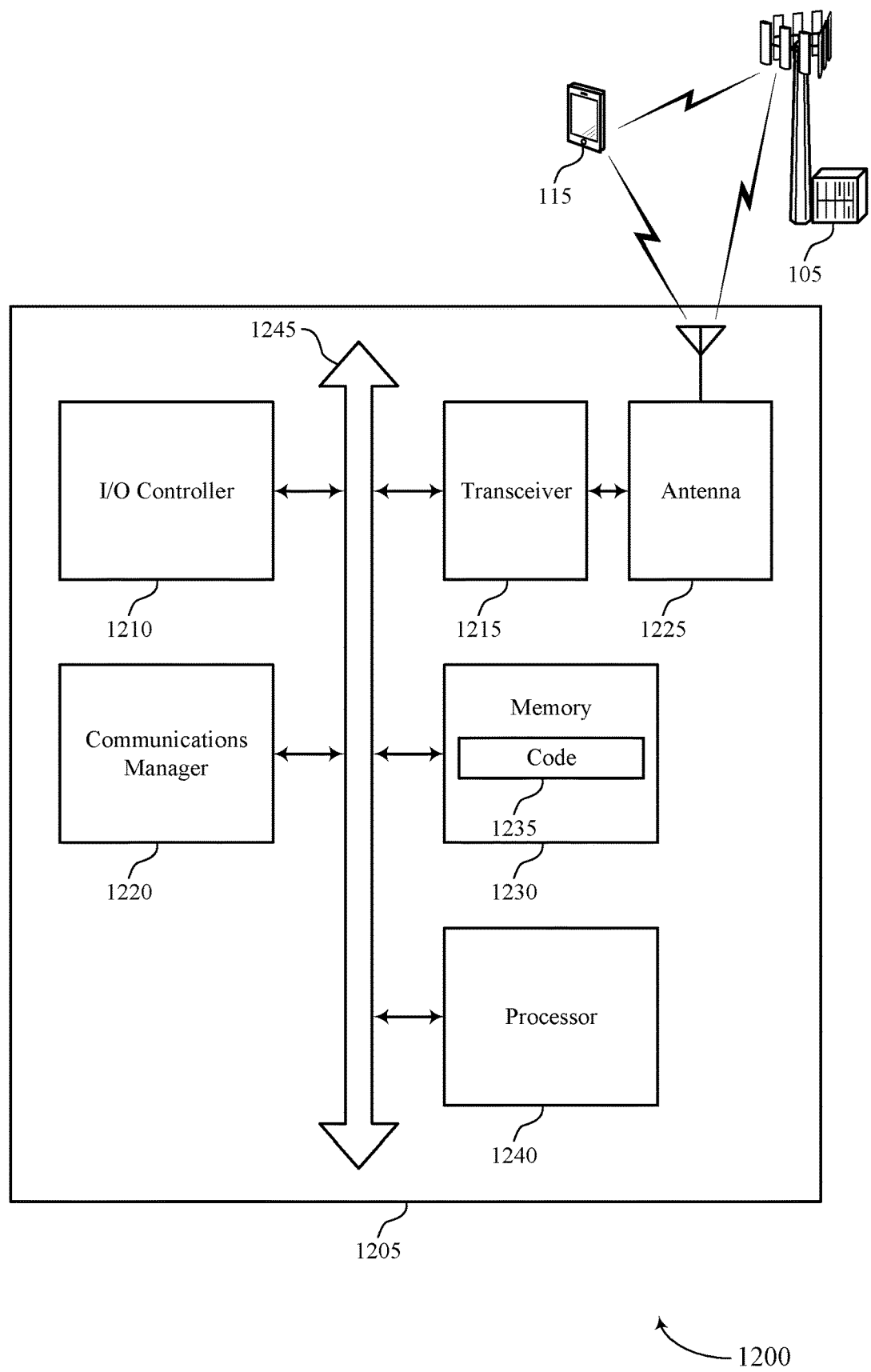
FIG. 12 shows a diagram of a system including a device that supports beam group UE capability in accordance with aspects of the present disclosure.

FIG. 12 shows a diagram of a system 1200 including a device 1205 that supports beam group UE capability in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting beam group UE capability). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for transmitting, to a base station, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. The communications manager 1220 may be configured as or otherwise support a means for transmitting, to the base station, a second indication of a second capability level of the UE, the second capability level corresponding to a second beam group of the set of multiple beam groups. The communications manager 1220 may be configured as or otherwise support a means for receiving signaling that indicates an activated capability level for the UE, where the activated capability level is one of the first capability level or the second capability level. The communications manager 1220 may be configured as or otherwise support a means for communicating with the base station based on the activated capability level using a corresponding beam group and the respective set of antenna components.

By including or configuring the communications manager 1220 in accordance with examples as described herein, the device 1205 may support techniques for reduced power consumption and more efficient utilization of communication resources. By operating in a UE cooperation mode, the device 1205 may receive communications at one or more different antenna panels located across multiple devices, which may provide for the processor of the device 1205 to more efficiently use communication resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of beam group UE capability as described herein, or the processor 1240 and the memory 1230 may be otherwise configured to perform or support such operations.

Figure 13:
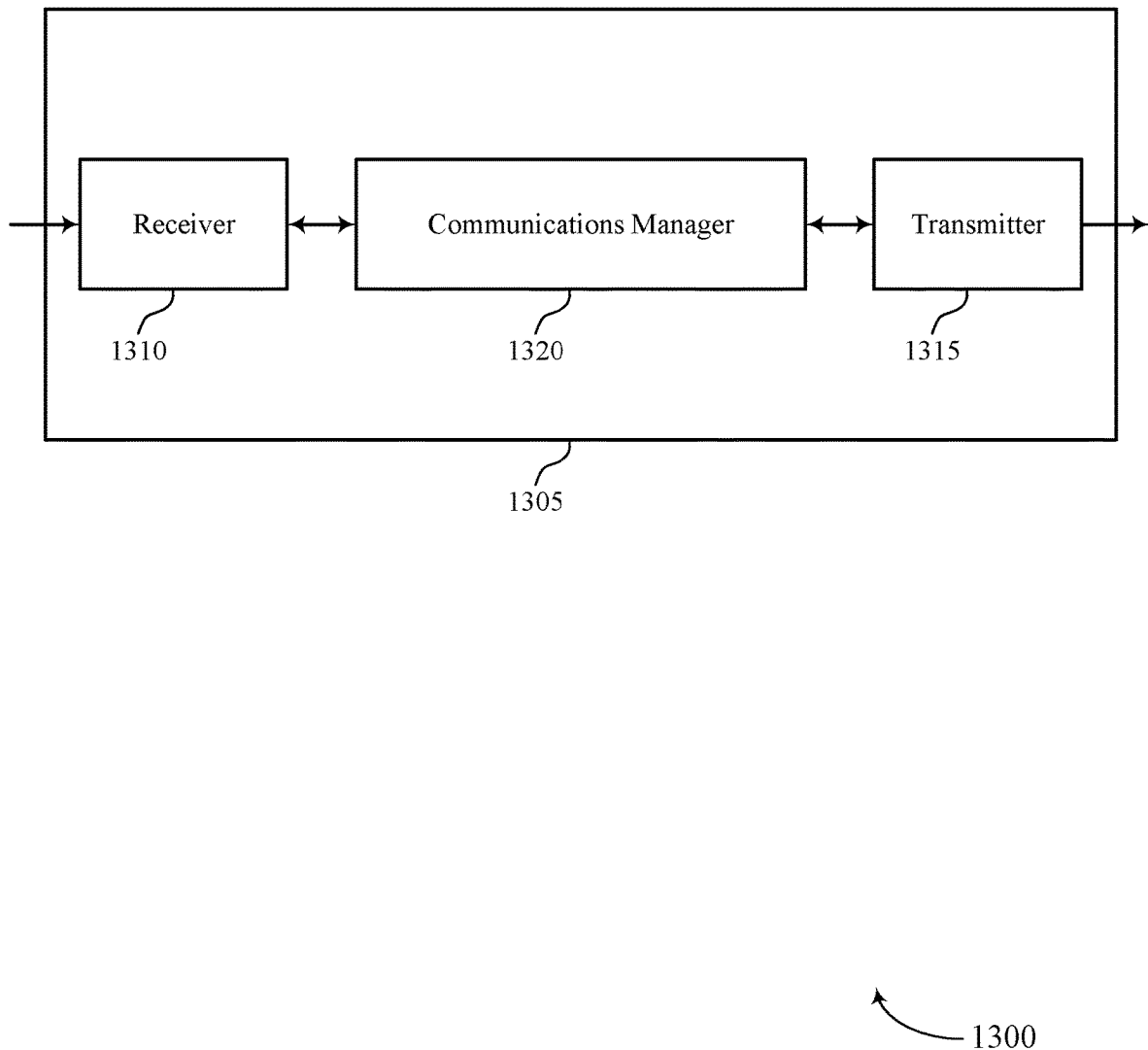
FIGS. 13 and 14 show block diagrams of devices that support beam group UE capability in accordance with aspects of the present disclosure.

FIG. 13 shows a block diagram 1300 of a device 1305 that supports beam group UE capability in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to beam group UE capability). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to beam group UE capability). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of beam group UE capability as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. For example, the communications manager 1320 may be configured as or otherwise support a means for receiving, from a UE, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. The communications manager 1320 may be configured as or otherwise support a means for receiving a second indication of a second capability level of the UE, the second capability level corresponding to a second beam group of the set of multiple beam groups. The communications manager 1320 may be configured as or otherwise support a means for selecting an activated capability level for the UE from the first capability level and the second capability level. The communications manager 1320 may be configured as or otherwise support a means for transmitting, to the UE, signaling that indicates the activated capability level, where the activated capability level is one of the first capability level or the second capability level.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for reduced power consumption and more efficient utilization of communication resources. By communicating according to reported capability levels, the processor of the device 1305 (e.g., a base station 105) may prepare more accurate communications and may refrain from preparing retransmissions (e.g., due to previous communications not being received at a UE 115).

Figure 14:
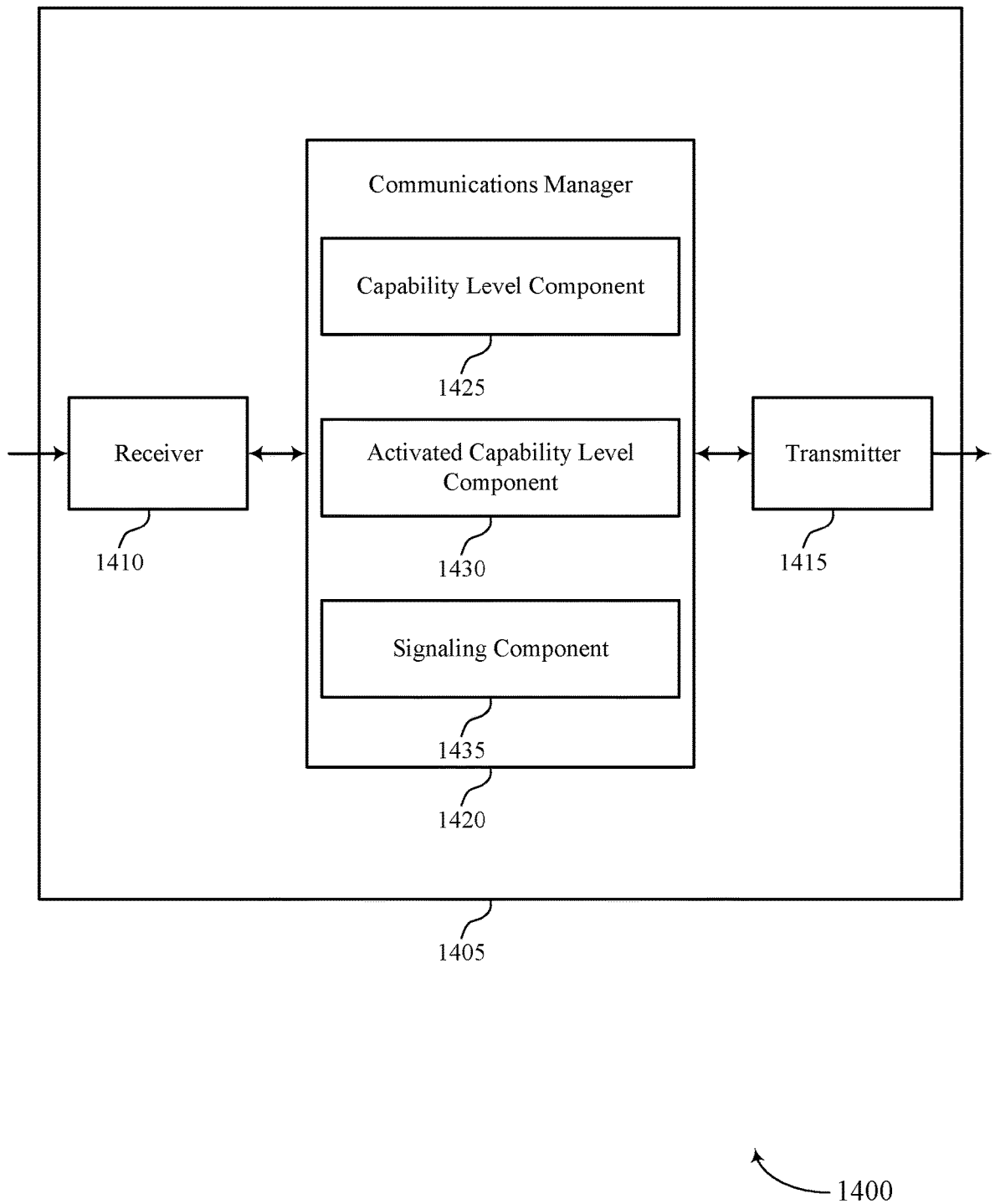

FIG. 14 shows a block diagram 1400 of a device 1405 that supports beam group UE capability in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to beam group UE capability). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to beam group UE capability). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of beam group UE capability as described herein. For example, the communications manager 1420 may include a capability level component 1425, an activated capability level component 1430, a signaling component 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a base station in accordance with examples as disclosed herein. The capability level component 1425 may be configured as or otherwise support a means for receiving, from a UE, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. The capability level component 1425 may be configured as or otherwise support a means for receiving a second indication of a second capability level of the UE, the second capability level corresponding to a second beam group of the set of multiple beam groups. The activated capability level component 1430 may be configured as or otherwise support a means for selecting an activated capability level for the UE from the first capability level and the second capability level. The signaling component 1435 may be configured as or otherwise support a means for transmitting, to the UE, signaling that indicates the activated capability level, where the activated capability level is one of the first capability level or the second capability level.

Figure 15:
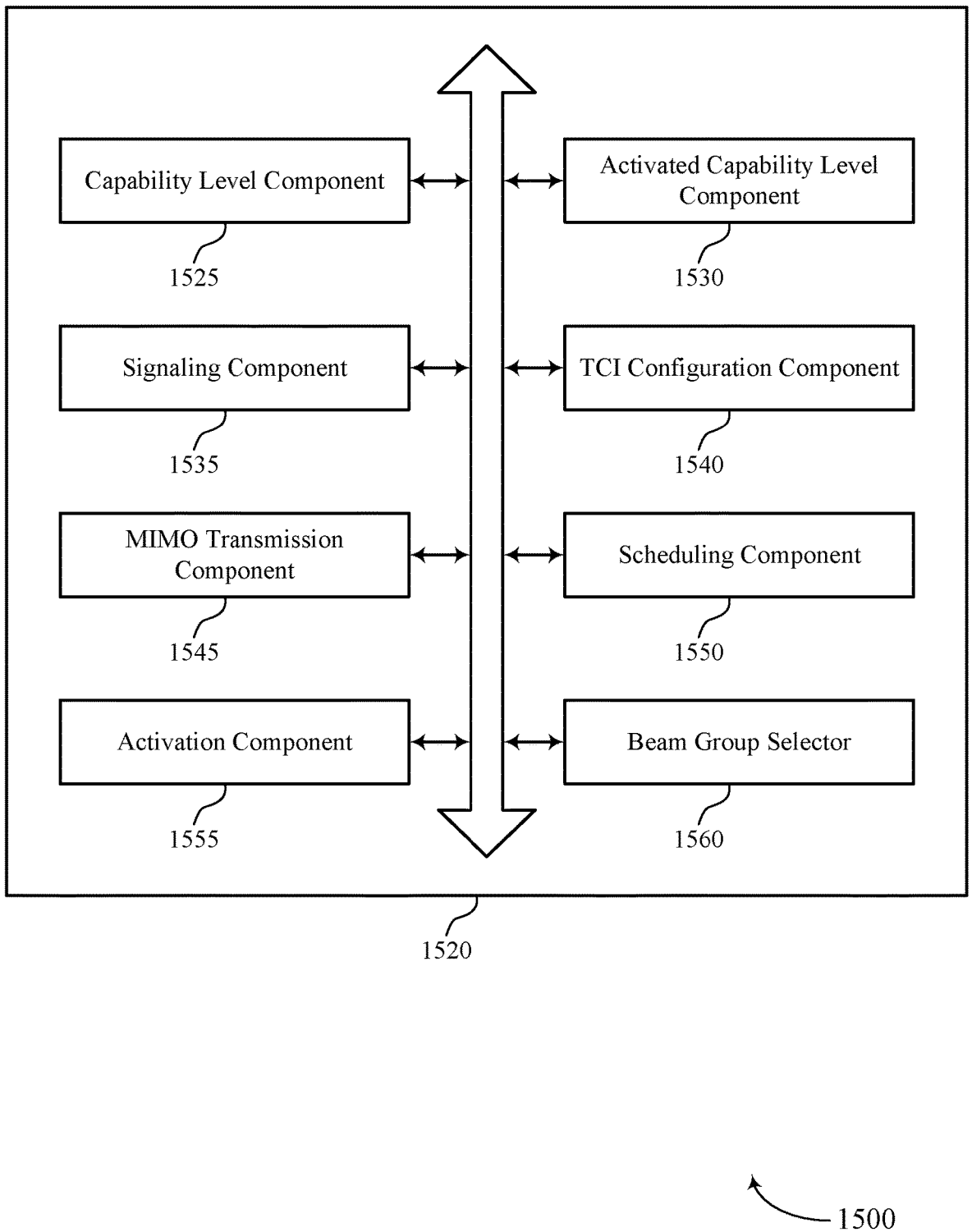
FIG. 15 shows a block diagram of a communications manager that supports beam group UE capability in accordance with aspects of the present disclosure.

FIG. 15 shows a block diagram 1500 of a communications manager 1520 that supports beam group UE capability in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of beam group UE capability as described herein. For example, the communications manager 1520 may include a capability level component 1525, an activated capability level component 1530, a signaling component 1535, a TCI configuration component 1540, a MIMO transmission component 1545, a scheduling component 1550, an activation component 1555, a beam group selector 1560, or any combination thereof. Each of these components may communicate, directly or indirectly, with one another (e.g., via one or more buses).

The communications manager 1520 may support wireless communications at a base station in accordance with examples as disclosed herein. The capability level component 1525 may be configured as or otherwise support a means for receiving, from a UE, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. In some examples, the capability level component 1525 may be configured as or otherwise support a means for receiving a second indication of a second capability level of the UE, the second capability level corresponding to a second beam group of the set of multiple beam groups. The activated capability level component 1530 may be configured as or otherwise support a means for selecting an activated capability level for the UE from the first capability level and the second capability level. The signaling component 1535 may be configured as or otherwise support a means for transmitting, to the UE, signaling that indicates the activated capability level, where the activated capability level is one of the first capability level or the second capability level.

In some examples, the activated capability level component 1530 may be configured as or otherwise support a means for communicating with the UE according to the activated capability level and a corresponding beam group, where the activated capability level is associated with the corresponding beam group for communications with the UE.

In some examples, the TCI configuration component 1540 may be configured as or otherwise support a means for transmitting, to the UE, a first configuration for a first TCI list, the first TCI list including a first set of multiple transmission configuration states for the UE, where the first TCI list is associated with the first beam group. In some examples, the TCI configuration component 1540 may be configured as or otherwise support a means for transmitting, to the UE, a second configuration for a second TCI list, the second TCI list including a second set of multiple transmission configuration states for the UE, where the second TCI list is associated with the second beam group.

In some examples, the MIMO transmission component 1545 may be configured as or otherwise support a means for communicating with the UE according to a number of MIMO transmission layers, where the number of MIMO transmission layers is based on the activated capability level.

In some examples, the scheduling component 1550 may be configured as or otherwise support a means for transmitting, to the UE, DCI that schedules data for the UE. In some examples, the activation component 1555 may be configured as or otherwise support a means for communicating, after an activation time period, the data with the UE, where the activation time period is based on the activated capability level.

In some examples, the beam group selector 1560 may be configured as or otherwise support a means for communicating with the UE using the first beam group. In some examples, the beam group selector 1560 may be configured as or otherwise support a means for switching from using the first beam group to the second beam group within a slot. In some examples, the beam group selector 1560 may be configured as or otherwise support a means for communicating with the UE using the second beam group, where a number of switches between the first beam group and the second beam group within the slot is based on the activated capability level.

In some examples, to support transmitting the signaling, the signaling component 1535 may be configured as or otherwise support a means for transmitting, to the UE, a MAC-CE indicating the activated capability level, where the MAC-CE indicates an antenna panel ID of the UE or a TCI state list ID associated with the activated capability level.

In some examples, the base station includes one or more transmission and reception points for communications with the UE.

Figure 16:
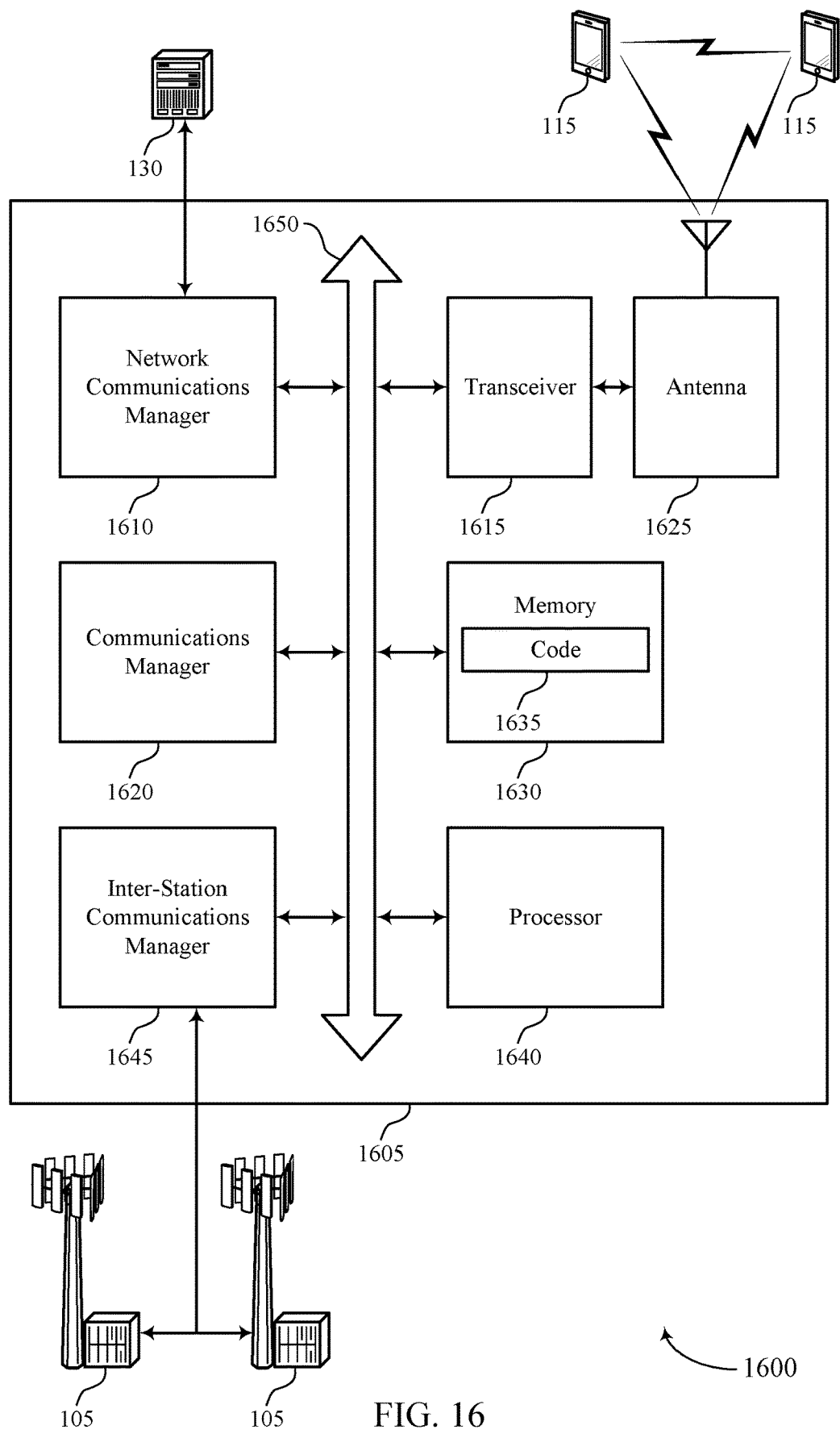
FIG. 16 shows a diagram of a system including a device that supports beam group UE capability in accordance with aspects of the present disclosure.

FIG. 16 shows a diagram of a system 1600 including a device 1605 that supports beam group UE capability in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting beam group UE capability). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communications at a base station in accordance with examples as disclosed herein. For example, the communications manager 1620 may be configured as or otherwise support a means for receiving, from a UE, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. The communications manager 1620 may be configured as or otherwise support a means for receiving a second indication of a second capability level of the UE, the second capability level corresponding to a second beam group of the set of multiple beam groups. The communications manager 1620 may be configured as or otherwise support a means for selecting an activated capability level for the UE from the first capability level and the second capability level. The communications manager 1620 may be configured as or otherwise support a means for transmitting, to the UE, signaling that indicates the activated capability level, where the activated capability level is one of the first capability level or the second capability level.

By including or configuring the communications manager 1620 in accordance with examples as described herein, the device 1605 may support techniques for improved communication reliability, reduced latency, and improved coordination between devices. By communicating according to reported capability levels, the device 1605 (e.g., a base station 105) may communicate with a UE 115 more efficiently and reliably. For example, the device 1605 may refrain from communicating with the UE 115 using capability levels that are not supported by the UE 115, which may improve accuracy of the communications and reduce retransmissions by the device 1305.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of beam group UE capability as described herein, or the processor 1640 and the memory 1630 may be otherwise configured to perform or support such operations.

Figure 17:
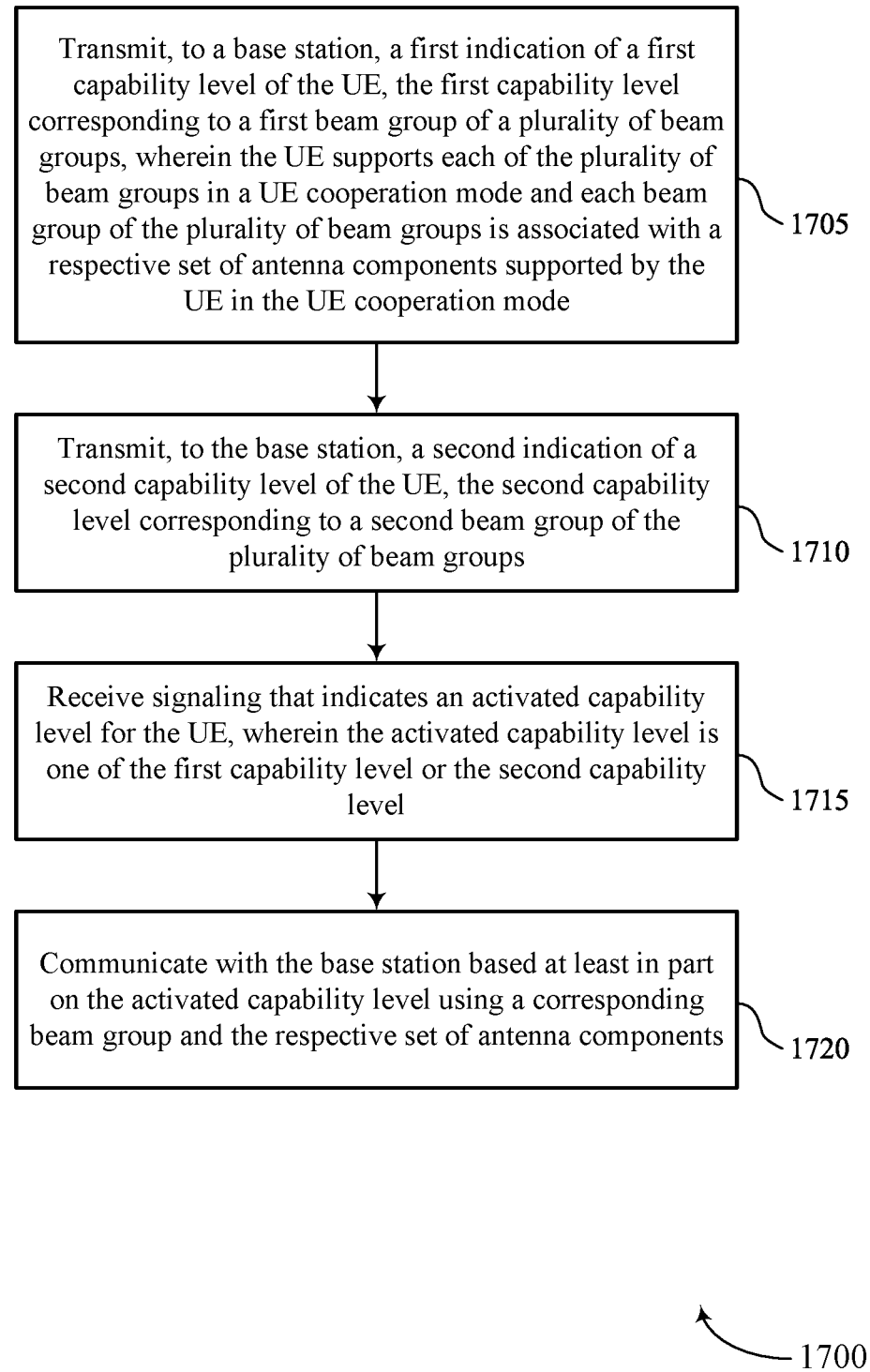
FIGS. 17 through 22 show flowcharts illustrating methods that support beam group UE capability in accordance with aspects of the present disclosure.

FIG. 17 shows a flowchart illustrating a method 1700 that supports beam group UE capability in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include transmitting, to a base station, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. The operations of 1705 may be performed in accordance with examples as disclosed herein. In some examples, aspects of the operations of 1705 may be performed by a capability level component 1125 as described with reference to FIG. 11.

At 1710, the method may include transmitting, to the base station, a second indication of a second capability level of the UE, the second capability level corresponding to a second beam group of the set of multiple beam groups. The operations of 1710 may be performed in accordance with examples as disclosed herein. In some examples, aspects of the operations of 1710 may be performed by a capability level component 1125 as described with reference to FIG. 11.

At 1715, the method may include receiving signaling that indicates an activated capability level for the UE, where the activated capability level is one of the first capability level or the second capability level. The operations of 1715 may be performed in accordance with examples as disclosed herein. In some examples, aspects of the operations of 1715 may be performed by an activated capability level component 1130 as described with reference to FIG. 11.

At 1720, the method may include communicating with the base station based on the activated capability level using a corresponding beam group and the respective set of antenna components. The operations of 1720 may be performed in accordance with examples as disclosed herein. In some examples, aspects of the operations of 1720 may be performed by a communication component 1135 as described with reference to FIG. 11.

Figure 18:
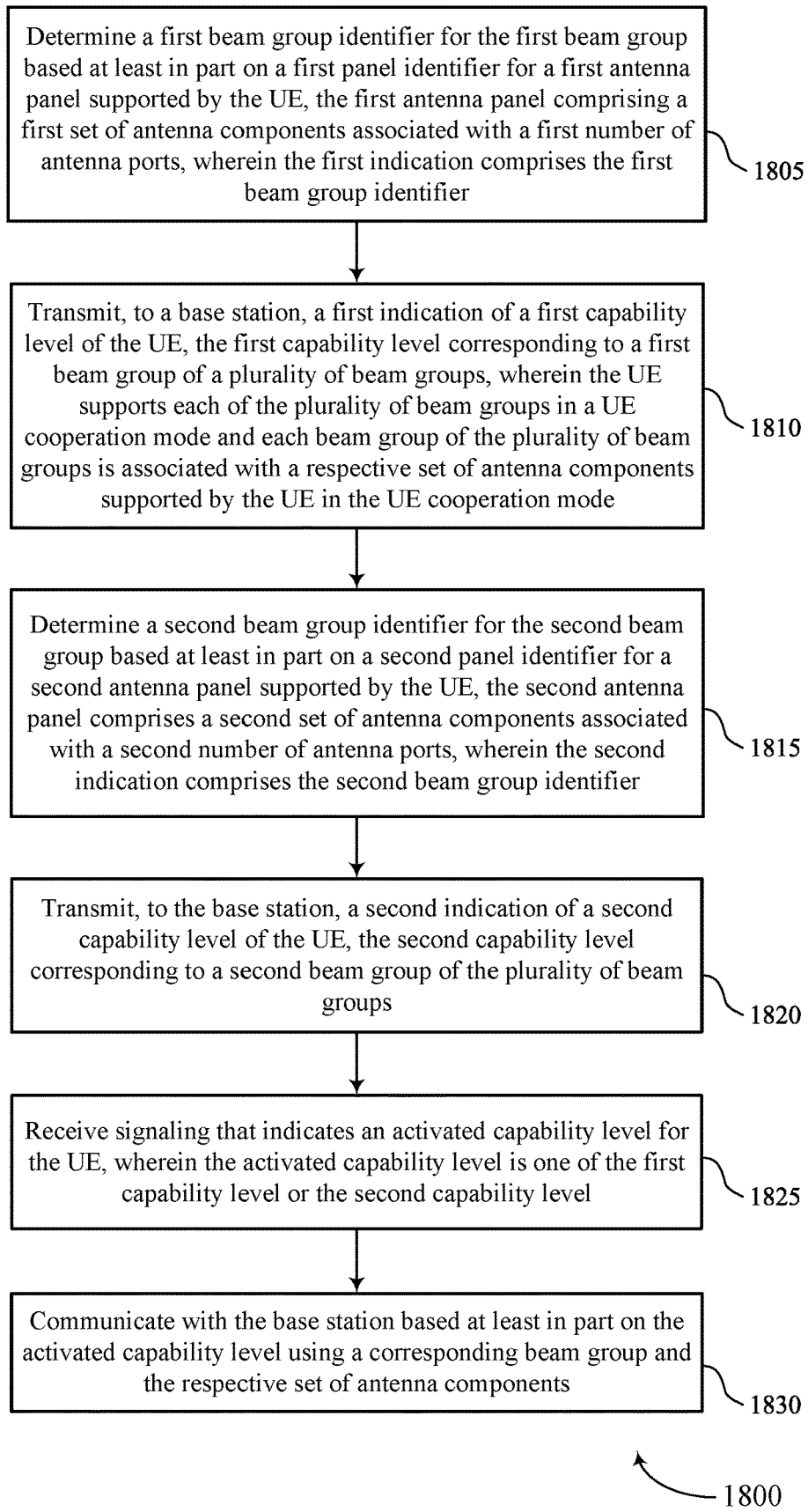

FIG. 18 shows a flowchart illustrating a method 1800 that supports beam group UE capability in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include determining a first beam group ID for the first beam group based on a first panel ID for a first antenna panel supported by the UE, the first antenna panel including a first set of antenna components associated with a first number of antenna ports, where the first indication includes the first beam group ID. The operations of 1805 may be performed in accordance with examples as disclosed herein. In some examples, aspects of the operations of 1805 may be performed by a beam group ID component 1140 as described with reference to FIG. 11.

At 1810, the method may include transmitting, to a base station, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. The operations of 1810 may be performed in accordance with examples as disclosed herein. In some examples, aspects of the operations of 1810 may be performed by a capability level component 1125 as described with reference to FIG. 11.

At 1815, the method may include determining a second beam group ID for the second beam group based on a second panel ID for a second antenna panel supported by the UE, the second antenna panel includes a second set of antenna components associated with a second number of antenna ports, where the second indication includes the second beam group ID. The operations of 1815 may be performed in accordance with examples as disclosed herein. In some examples, aspects of the operations of 1815 may be performed by a beam group ID component 1140 as described with reference to FIG. 11.

At 1820, the method may include transmitting, to the base station, a second indication of a second capability level of the UE, the second capability level corresponding to a second beam group of the set of multiple beam groups. The operations of 1820 may be performed in accordance with examples as disclosed herein. In some examples, aspects of the operations of 1820 may be performed by a capability level component 1125 as described with reference to FIG. 11.

At 1825, the method may include receiving signaling that indicates an activated capability level for the UE, where the activated capability level is one of the first capability level or the second capability level. The operations of 1825 may be performed in accordance with examples as disclosed herein. In some examples, aspects of the operations of 1825 may be performed by an activated capability level component 1130 as described with reference to FIG. 11.

At 1830, the method may include communicating with the base station based on the activated capability level using a corresponding beam group and the respective set of antenna components. The operations of 1830 may be performed in accordance with examples as disclosed herein. In some examples, aspects of the operations of 1830 may be performed by a communication component 1135 as described with reference to FIG. 11.

Figure 19:
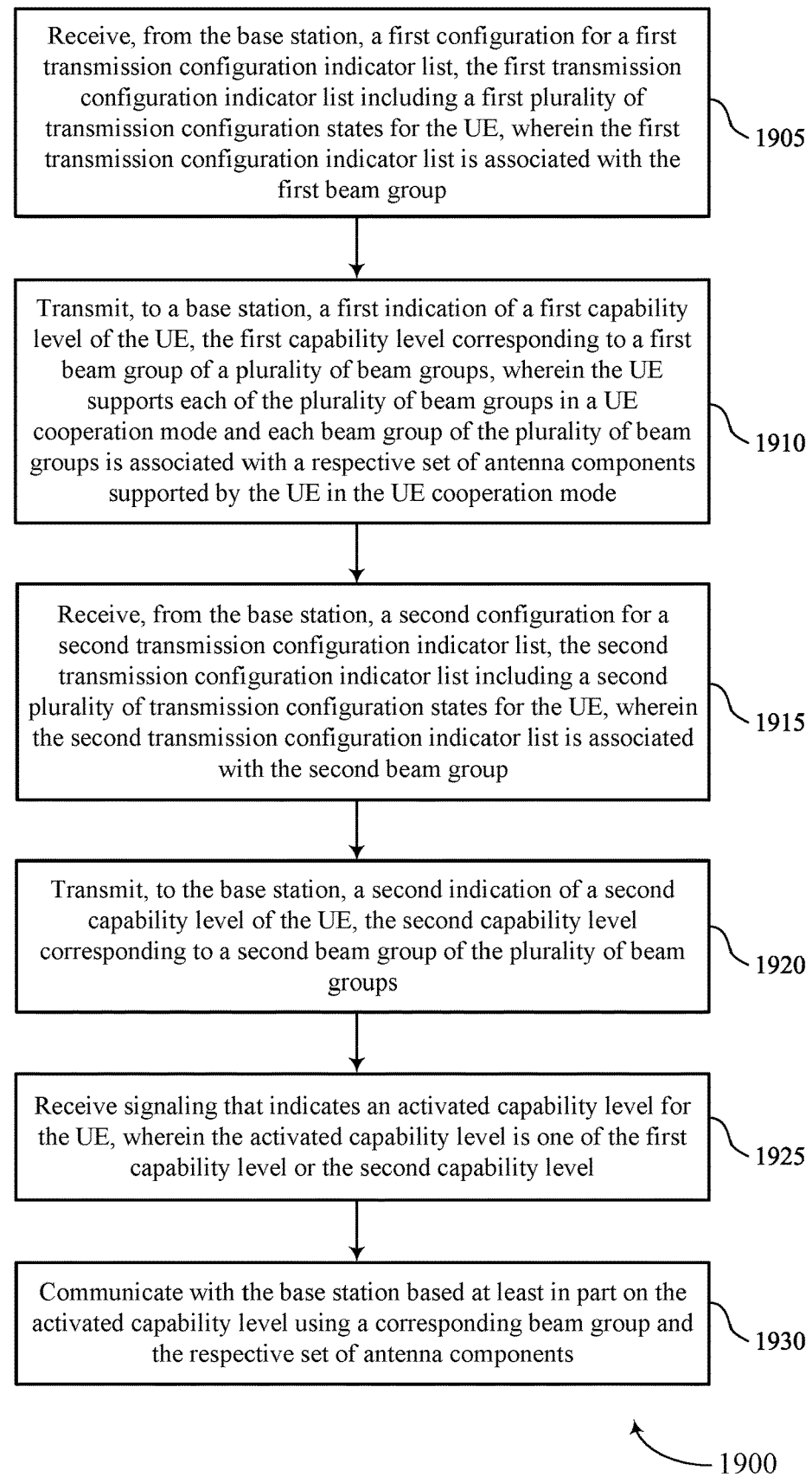

FIG. 19 shows a flowchart illustrating a method 1900 that supports beam group UE capability in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1905, the method may include receiving, from the base station, a first configuration for a first TCI list, the first TCI list including a first set of multiple transmission configuration states for the UE, where the first TCI list is associated with the first beam group. The operations of 1905 may be performed in accordance with examples as disclosed herein. In some examples, aspects of the operations of 1905 may be performed by a TCI component 1145 as described with reference to FIG. 11.

At 1910, the method may include transmitting, to a base station, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. The operations of 1910 may be performed in accordance with examples as disclosed herein. In some examples, aspects of the operations of 1910 may be performed by a capability level component 1125 as described with reference to FIG. 11.

At 1915, the method may include receiving, from the base station, a second configuration for a second TCI list, the second TCI list including a second set of multiple transmission configuration states for the UE, where the second TCI list is associated with the second beam group. The operations of 1915 may be performed in accordance with examples as disclosed herein. In some examples, aspects of the operations of 1915 may be performed by a TCI component 1145 as described with reference to FIG. 11.

At 1920, the method may include transmitting, to the base station, a second indication of a second capability level of the UE, the second capability level corresponding to a second beam group of the set of multiple beam groups. The operations of 1920 may be performed in accordance with examples as disclosed herein. In some examples, aspects of the operations of 1920 may be performed by a capability level component 1125 as described with reference to FIG. 11.

At 1925, the method may include receiving signaling that indicates an activated capability level for the UE, where the activated capability level is one of the first capability level or the second capability level. The operations of 1925 may be performed in accordance with examples as disclosed herein. In some examples, aspects of the operations of 1925 may be performed by an activated capability level component 1130 as described with reference to FIG. 11.

At 1930, the method may include communicating with the base station based on the activated capability level using a corresponding beam group and the respective set of antenna components. The operations of 1930 may be performed in accordance with examples as disclosed herein. In some examples, aspects of the operations of 1930 may be performed by a communication component 1135 as described with reference to FIG. 11.

Figure 20:
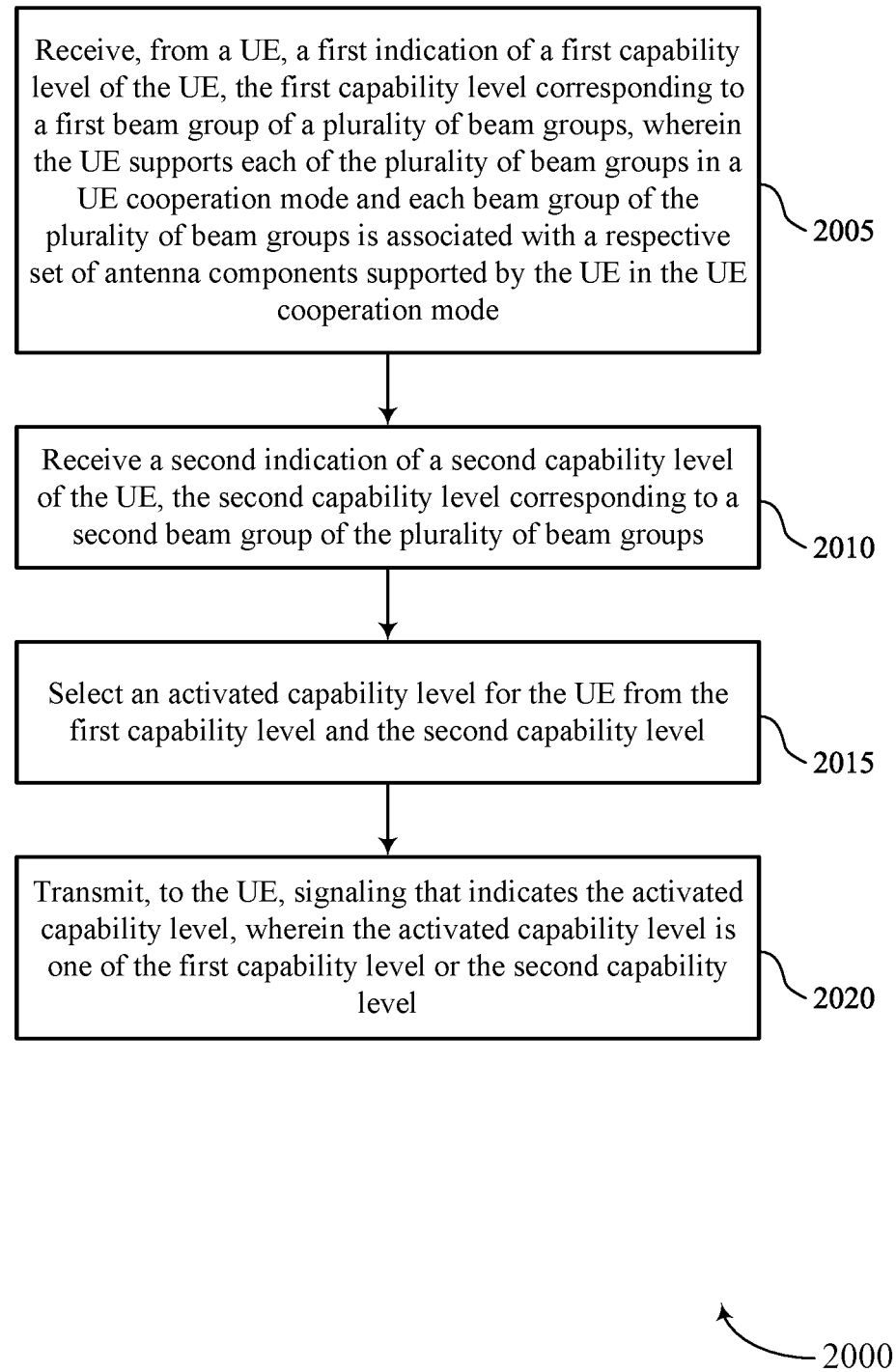

FIG. 20 shows a flowchart illustrating a method 2000 that supports beam group UE capability in accordance with aspects of the present disclosure. The operations of the method 2000 may be implemented by a base station or its components as described herein. For example, the operations of the method 2000 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2005, the method may include receiving, from a UE, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. The operations of 2005 may be performed in accordance with examples as disclosed herein. In some examples, aspects of the operations of 2005 may be performed by a capability level component 1525 as described with reference to FIG. 15.

At 2010, the method may include receiving a second indication of a second capability level of the UE, the second capability level corresponding to a second beam group of the set of multiple beam groups. The operations of 2010 may be performed in accordance with examples as disclosed herein. In some examples, aspects of the operations of 2010 may be performed by a capability level component 1525 as described with reference to FIG. 15.

At 2015, the method may include selecting an activated capability level for the UE from the first capability level and the second capability level. The operations of 2015 may be performed in accordance with examples as disclosed herein. In some examples, aspects of the operations of 2015 may be performed by an activated capability level component 1530 as described with reference to FIG. 15.

At 2020, the method may include transmitting, to the UE, signaling that indicates the activated capability level, where the activated capability level is one of the first capability level or the second capability level. The operations of 2020 may be performed in accordance with examples as disclosed herein. In some examples, aspects of the operations of 2020 may be performed by a signaling component 1535 as described with reference to FIG. 15.

Figure 21:
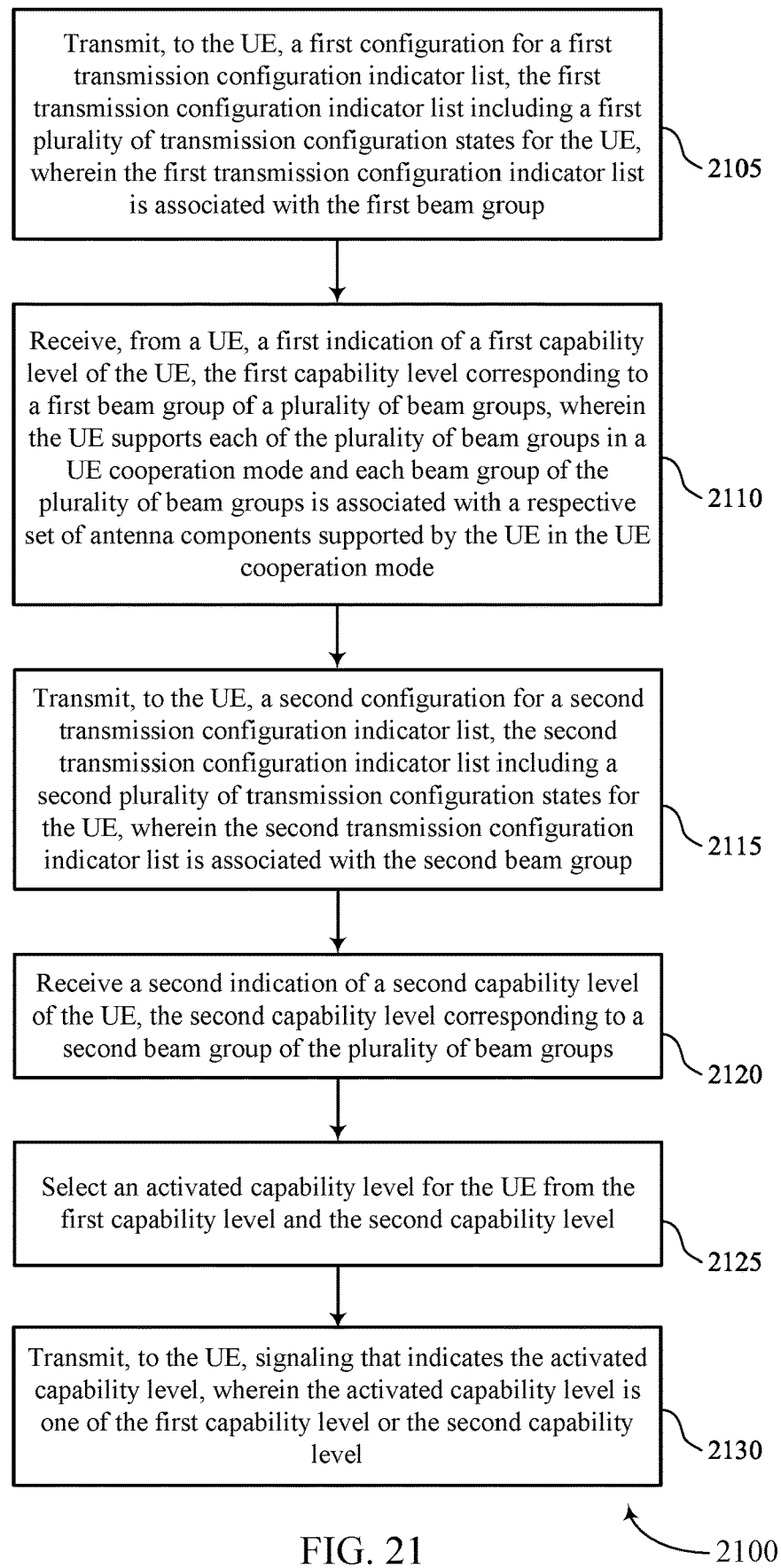

FIG. 21 shows a flowchart illustrating a method 2100 that supports beam group UE capability in accordance with aspects of the present disclosure. The operations of the method 2100 may be implemented by a base station or its components as described herein. For example, the operations of the method 2100 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2105, the method may include transmitting, to the UE, a first configuration for a first TCI list, the first TCI list including a first set of multiple transmission configuration states for the UE, where the first TCI list is associated with the first beam group. The operations of 2105 may be performed in accordance with examples as disclosed herein. In some examples, aspects of the operations of 2105 may be performed by a TCI configuration component 1540 as described with reference to FIG. 15.

At 2110, the method may include receiving, from a UE, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. The operations of 2110 may be performed in accordance with examples as disclosed herein. In some examples, aspects of the operations of 2110 may be performed by a capability level component 1525 as described with reference to FIG. 15.

At 2115, the method may include transmitting, to the UE, a second configuration for a second TCI list, the second TCI list including a second set of multiple transmission configuration states for the UE, where the second TCI list is associated with the second beam group. The operations of 2115 may be performed in accordance with examples as disclosed herein. In some examples, aspects of the operations of 2115 may be performed by a TCI configuration component 1540 as described with reference to FIG. 15.

At 2120, the method may include receiving a second indication of a second capability level of the UE, the second capability level corresponding to a second beam group of the set of multiple beam groups. The operations of 2120 may be performed in accordance with examples as disclosed herein. In some examples, aspects of the operations of 2120 may be performed by a capability level component 1525 as described with reference to FIG. 15.

At 2125, the method may include selecting an activated capability level for the UE from the first capability level and the second capability level. The operations of 2125 may be performed in accordance with examples as disclosed herein. In some examples, aspects of the operations of 2125 may be performed by an activated capability level component 1530 as described with reference to FIG. 15.

At 2130, the method may include transmitting, to the UE, signaling that indicates the activated capability level, where the activated capability level is one of the first capability level or the second capability level. The operations of 2130 may be performed in accordance with examples as disclosed herein. In some examples, aspects of the operations of 2130 may be performed by a signaling component 1535 as described with reference to FIG. 15.

Figure 22:
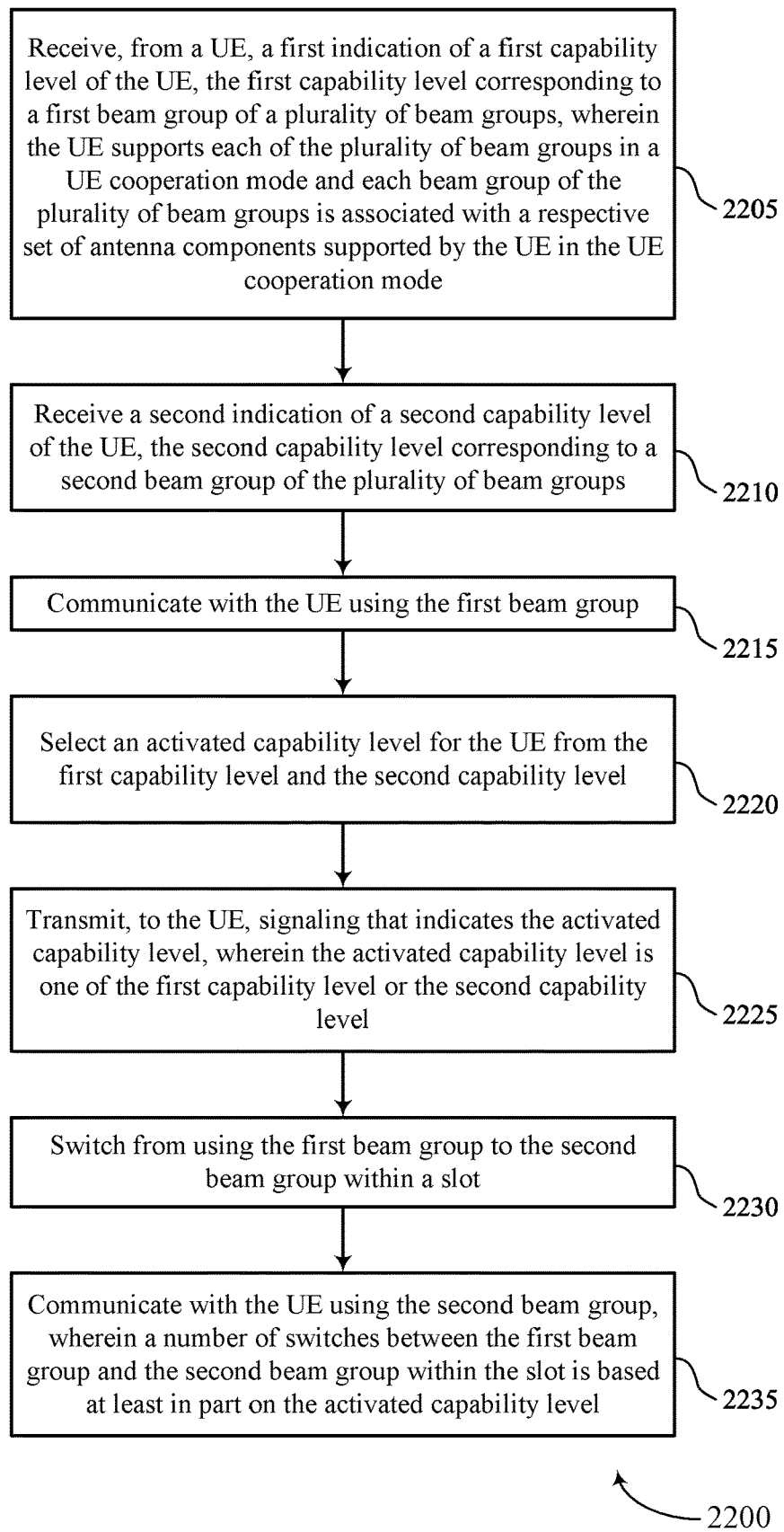

FIG. 22 shows a flowchart illustrating a method 2200 that supports beam group UE capability in accordance with aspects of the present disclosure. The operations of the method 2200 may be implemented by a base station or its components as described herein. For example, the operations of the method 2200 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2205, the method may include receiving, from a UE, a first indication of a first capability level of the UE, the first capability level corresponding to a first beam group of a set of multiple beam groups, where the UE supports each of the set of multiple beam groups in a UE cooperation mode and each beam group of the set of multiple beam groups is associated with a respective set of antenna components supported by the UE in the UE cooperation mode. The operations of 2205 may be performed in accordance with examples as disclosed herein. In some examples, aspects of the operations of 2205 may be performed by a capability level component 1525 as described with reference to FIG. 15.

At 2210, the method may include receiving a second indication of a second capability level of the UE, the second capability level corresponding to a second beam group of the set of multiple beam groups. The operations of 2210 may be performed in accordance with examples as disclosed herein. In some examples, aspects of the operations of 2210 may be performed by a capability level component 1525 as described with reference to FIG. 15.

At 2215, the method may include communicating with the UE using the first beam group. The operations of 2215 may be performed in accordance with examples as disclosed herein. In some examples, aspects of the operations of 2215 may be performed by a beam group selector 1560 as described with reference to FIG. 15.

At 2220, the method may include selecting an activated capability level for the UE from the first capability level and the second capability level. The operations of 2220 may be performed in accordance with examples as disclosed herein. In some examples, aspects of the operations of 2220 may be performed by an activated capability level component 1530 as described with reference to FIG. 15.

At 2225, the method may include transmitting, to the UE, signaling that indicates the activated capability level, where the activated capability level is one of the first capability level or the second capability level. The operations of 2225 may be performed in accordance with examples as disclosed herein. In some examples, aspects of the operations of 2225 may be performed by a signaling component 1535 as described with reference to FIG. 15.

At 2230, the method may include switching from using the first beam group to the second beam group within a slot. The operations of 2230 may be performed in accordance with examples as disclosed herein. In some examples, aspects of the operations of 2230 may be performed by a beam group selector 1560 as described with reference to FIG. 15.

At 2235, the method may include communicating with the UE using the second beam group, where a number of switches between the first beam group and the second beam group within the slot is based on the activated capability level. The operations of 2235 may be performed in accordance with examples as disclosed herein. In some examples, aspects of the operations of 2235 may be performed by a beam group selector 1560 as described with reference to FIG. 15.

SUMMARY OF ASPECTS

The following provides an overview of aspects of the present disclosure:

Aspect 1: A method for wireless communications at a UE, comprising: transmitting, to a base station, a first indication of a first capability level of the UE, the first capability level corresponding to a first beam group of a plurality of beam groups, wherein the UE supports each of the plurality of beam groups in a UE cooperation mode and each beam group of the plurality of beam groups is associated with a respective set of antenna components supported by the UE in the UE cooperation mode; transmitting, to the base station, a second indication of a second capability level of the UE, the second capability level corresponding to a second beam group of the plurality of beam groups; receiving signaling that indicates an activated capability level for the UE, wherein the activated capability level is one of the first capability level or the second capability level; and communicating with the base station based at least in part on the activated capability level using a corresponding beam group and the respective set of antenna components.

Aspect 2: The method of aspect 1, further comprising: determining a first beam group ID for the first beam group based at least in part on a first panel ID for a first antenna panel supported by the UE, the first antenna panel comprising a first set of antenna components associated with a first number of antenna ports, wherein the first indication comprises the first beam group ID; determining a second beam group ID for the second beam group based at least in part on a second panel ID for a second antenna panel supported by the UE, the second antenna panel comprises a second set of antenna components associated with a second number of antenna ports, wherein the second indication comprises the second beam group ID.

Aspect 3: The method of any of aspects 1 through 2, further comprising: receiving, from the base station, a first configuration for a first TCI list, the first TCI list including a first plurality of transmission configuration states for the UE, wherein the first TCI list is associated with the first beam group; and receiving, from the base station, a second configuration for a second TCI list, the second TCI list including a second plurality of transmission configuration states for the UE, wherein the second TCI list is associated with the second beam group.

Aspect 4: The method of aspect 3, further comprising: determining a first beam group ID for the first beam group based at least in part on a first ID for the first TCI list, wherein the first indication comprises the first beam group ID; and determining a second beam group ID for the second beam group based at least in part on a second ID for the second TCI list, wherein the second indication comprises the second beam group ID.

Aspect 5: The method of any of aspects 1 through 4, further comprising: determining a first antenna panel supported by the UE, wherein the first antenna panel is a physical antenna panel at the UE and the first indication indicates the first antenna panel; and determining a second antenna panel supported by the UE, wherein the second antenna panel is a virtualized antenna panel comprising at least a second physical antenna panel at another device and the second indication indicates the second antenna panel.

Aspect 6: The method of any of aspects 1 through 5, further comprising: applying the activated capability level after an activation time period, wherein the first beam group is associated with a first activation time period and the second beam group is associated with a second activation time period.

Aspect 7: The method of any of aspects 1 through 6, further comprising: determining the first capability level of the UE based at least in part on a first number of MIMO transmission layers supported by the UE for the first beam group, wherein the first number of MIMO transmission layers supported by the UE is based at least in part on a first number of antenna ports; and determining the second capability level of the UE based at least in part on a second number of MIMO transmission layers supported by the UE for the second beam group, wherein the second number of MIMO transmission layers supported by the UE is based at least in part on a second number of antenna ports.

Aspect 8: The method of any of aspects 1 through 7, further comprising: determining the first capability level of the UE based at least in part on a first processing time supported by the UE, wherein the first processing time is a first time gap between receiving DCI and data scheduled by the downlink control information for the UE according to the first beam group; and determining the second capability level of the UE based at least in part on a second processing time supported by the UE, wherein the second processing time is a second time gap between receiving DCI and data scheduled by the downlink control information for the UE according to the second beam group.

Aspect 9: The method of any of aspects 1 through 8, further comprising: determining the first capability level of the UE based at least in part on a first number of beam switches per slot supported by the UE; and determining the second capability level of the UE based at least in part on a second number of beam switches per slot supported by the UE.

Aspect 10: The method of aspect 9, wherein the first number of beam switches per slot and the second number of beam switches per slot supported by the UE are based at least in part on a radio frequency switching time, a configuration between antenna panels at the UE, or both.

Aspect 11: The method of any of aspects 1 through 10, wherein receiving the signaling comprises: receiving a MAC-CE indicating the activated capability level, wherein the MAC-CE indicates an antenna panel ID or a TCI state list ID associated with the activated capability level.

Aspect 12: A method for wireless communications at a base station, comprising: receiving, from a UE, a first indication of a first capability level of the UE, the first capability level corresponding to a first beam group of a plurality of beam groups, wherein the UE supports each of the plurality of beam groups in a UE cooperation mode and each beam group of the plurality of beam groups is associated with a respective set of antenna components supported by the UE in the UE cooperation mode; receiving a second indication of a second capability level of the UE, the second capability level corresponding to a second beam group of the plurality of beam groups; selecting an activated capability level for the UE from the first capability level and the second capability level; and transmitting, to the UE, signaling that indicates the activated capability level, wherein the activated capability level is one of the first capability level or the second capability level.

Aspect 13: The method of aspect 12, further comprising: communicating with the UE according to the activated capability level and a corresponding beam group, wherein the activated capability level is associated with the corresponding beam group for communications with the UE.

Aspect 14: The method of any of aspects 12 through 13, further comprising: transmitting, to the UE, a first configuration for a first TCI list, the first TCI list including a first plurality of transmission configuration states for the UE, wherein the first TCI list is associated with the first beam group; and transmitting, to the UE, a second configuration for a second TCI list, the second TCI list including a second plurality of transmission configuration states for the UE, wherein the second TCI list is associated with the second beam group.

Aspect 15: The method of any of aspects 12 through 14, further comprising: communicating with the UE according to a number of MIMO transmission layers, wherein the number of MIMO transmission layers is based at least in part on the activated capability level.

Aspect 16: The method of any of aspects 12 through 15, further comprising: transmitting, to the UE, DCI that schedules data for the UE; and communicating, after an activation time period, the data with the UE, wherein the activation time period is based at least in part on the activated capability level.

Aspect 17: The method of any of aspects 12 through 16, further comprising: communicating with the UE using the first beam group; switching from using the first beam group to the second beam group within a slot; and communicating with the UE using the second beam group, wherein a number of switches between the first beam group and the second beam group within the slot is based at least in part on the activated capability level.

Aspect 18: The method of any of aspects 12 through 17, wherein transmitting the signaling comprises: transmitting, to the UE, a MAC-CE indicating the activated capability level, wherein the MAC-CE indicates an antenna panel ID of the UE or a TCI state list ID associated with the activated capability level.

Aspect 19: The method of any of aspects 12 through 18, wherein the base station comprises one or more TRPs for communications with the UE.

Aspect 20: An apparatus for wireless communications at a UE, comprising a processor; memory coupled with the processor; and instructions stored in the memory and executable by the processor to cause the apparatus to perform a method of any of aspects 1 through 11.

Aspect 21: An apparatus for wireless communications at a UE, comprising at least one means for performing a method of any of aspects 1 through 11.

Aspect 22: A non-transitory computer-readable medium storing code for wireless communications at a UE, the code comprising instructions executable by a processor to perform a method of any of aspects 1 through 11.

Aspect 23: An apparatus for wireless communications at a base station, comprising a processor; memory coupled with the processor; and instructions stored in the memory and executable by the processor to cause the apparatus to perform a method of any of aspects 12 through 19.

Aspect 24: An apparatus for wireless communications at a base station, comprising at least one means for performing a method of any of aspects 12 through 19.

Aspect 25: A non-transitory computer-readable medium storing code for wireless communications at a base station, the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   transmitting a first indication of a first capability level of the UE, the first capability level corresponding to a first beam group of a plurality of beam groups, wherein the UE supports each of the plurality of beam groups in a UE cooperation mode and each beam group of the plurality of beam groups is associated with a respective set of antenna components supported by the UE in the UE cooperation mode;
   transmitting a second indication of a second capability level of the UE, the second capability level corresponding to a second beam group of the plurality of beam groups, wherein the first beam group, the second beam group, or both corresponds to a virtual antenna panel, the virtual antenna panel comprising at least one physical antenna panel at the UE and at least one physical antenna panel at another device associated with the UE cooperation mode;
   receiving signaling that indicates an activated capability level for the UE, wherein the activated capability level is one of the first capability level or the second capability level; and
   communicating with a network device based at least in part on the activated capability level using a corresponding beam group and the respective set of antenna components.

2. The method of claim 1, further comprising:
   determining a first beam group identifier for the first beam group based at least in part on a first panel identifier for a first antenna panel supported by the UE, the first antenna panel comprising a first set of antenna components associated with a first number of antenna ports, wherein the first indication comprises the first beam group identifier; and
   determining a second beam group identifier for the second beam group based at least in part on a second panel identifier for a second antenna panel supported by the UE, the second antenna panel comprises a second set of antenna components associated with a second number of antenna ports, wherein the second indication comprises the second beam group identifier.

3. The method of claim 1, further comprising:
   receiving, from the network device, a first configuration for a first transmission configuration indicator list, the first transmission configuration indicator list including a first plurality of transmission configuration states for the UE, wherein the first transmission configuration indicator list is associated with the first beam group; and
   receiving, from the network device, a second configuration for a second transmission configuration indicator list, the second transmission configuration indicator list including a second plurality of transmission configuration states for the UE, wherein the second transmission configuration indicator list is associated with the second beam group.

4. The method of claim 3, further comprising:
   determining a first beam group identifier for the first beam group based at least in part on a first identifier for the first transmission configuration indicator list, wherein the first indication comprises the first beam group identifier; and
   determining a second beam group identifier for the second beam group based at least in part on a second identifier for the second transmission configuration indicator list, wherein the second indication comprises the second beam group identifier.

5. The method of claim 1, further comprising:
   determining a first antenna panel supported by the UE, wherein the first antenna panel is the at least one physical antenna panel at the UE and the first indication indicates the first antenna panel; and
   determining a second antenna panel supported by the UE, wherein the second antenna panel is the virtual antenna panel comprising the at least one physical antenna panel at the another device associated with the UE cooperation mode and the second indication indicates the second antenna panel.

6. The method of claim 1, further comprising:
   applying the activated capability level after an activation time period, wherein the first beam group is associated with a first activation time period and the second beam group is associated with a second activation time period.

7. The method of claim 1, further comprising:
determining the first capability level of the UE based at least in part on a first number of multiple input multiple output transmission layers supported by the UE for the first beam group, wherein the first number of multiple input multiple output transmission layers supported by the UE is based at least in part on a first number of antenna ports; and
determining the second capability level of the UE based at least in part on a second number of multiple input multiple output transmission layers supported by the UE for the second beam group, wherein the second number of multiple input multiple output transmission layers supported by the UE is based at least in part on a second number of antenna ports.

8. The method of claim 1, further comprising:
determining the first capability level of the UE based at least in part on a first processing time supported by the UE, wherein the first processing time is a first time gap between receiving downlink control information and data scheduled by the downlink control information for the UE according to the first beam group; and
determining the second capability level of the UE based at least in part on a second processing time supported by the UE, wherein the second processing time is a second time gap between receiving downlink control information and data scheduled by the downlink control information for the UE according to the second beam group.

9. The method of claim 1, further comprising:
determining the first capability level of the UE based at least in part on a first number of beam switches per slot supported by the UE; and
determining the second capability level of the UE based at least in part on a second number of beam switches per slot supported by the UE.

10. The method of claim 9, wherein the first number of beam switches per slot and the second number of beam switches per slot supported by the UE are based at least in part on a radio frequency switching time, a configuration between antenna panels at the UE, or both.

11. The method of claim 1, wherein receiving the signaling comprises:
receiving a medium access control element (MAC-CE) indicating the activated capability level, wherein the MAC-CE indicates an antenna panel identifier or a transmission configuration indicator state list identifier associated with the activated capability level.

12. A method for wireless communications at a network device, comprising:
receiving, from a user equipment (UE), a first indication of a first capability level of the UE, the first capability level corresponding to a first beam group of a plurality of beam groups, wherein the UE supports each of the plurality of beam groups in a UE cooperation mode and each beam group of the plurality of beam groups is associated with a respective set of antenna components supported by the UE in the UE cooperation mode;
receiving a second indication of a second capability level of the UE, the second capability level corresponding to a second beam group of the plurality of beam groups, wherein the first beam group, the second beam group, or both corresponds to a virtual antenna panel, the virtual antenna panel comprising at least one physical antenna panel at the UE and at least one physical antenna panel at another device associated with the UE cooperation mode;
selecting an activated capability level for the UE from the first capability level and the second capability level; and
transmitting, to the UE, signaling that indicates the activated capability level, wherein the activated capability level is one of the first capability level or the second capability level.

13. The method of claim 12, further comprising:
communicating with the UE according to the activated capability level and a corresponding beam group, wherein the activated capability level is associated with the corresponding beam group for communications with the UE.

14. The method of claim 12, further comprising:
transmitting, to the UE, a first configuration for a first transmission configuration indicator list, the first transmission configuration indicator list including a first plurality of transmission configuration states for the UE, wherein the first transmission configuration indicator list is associated with the first beam group; and
transmitting, to the UE, a second configuration for a second transmission configuration indicator list, the second transmission configuration indicator list including a second plurality of transmission configuration states for the UE, wherein the second transmission configuration indicator list is associated with the second beam group.

15. The method of claim 12, further comprising:
communicating with the UE according to a number of multiple input multiple output transmission layers, wherein the number of multiple input multiple output transmission layers is based at least in part on the activated capability level.

16. The method of claim 12, further comprising:
transmitting, to the UE, downlink control information that schedules data for the UE; and
communicating, after an activation time period, the data with the UE, wherein the activation time period is based at least in part on the activated capability level.

17. The method of claim 12, further comprising:
communicating with the UE using the first beam group;
switching from using the first beam group to the second beam group within a slot; and
communicating with the UE using the second beam group, wherein a number of switches between the first beam group and the second beam group within the slot is based at least in part on the activated capability level.

18. The method of claim 12, wherein transmitting the signaling comprises:
transmitting, to the UE, a medium access control element (MAC-CE) indicating the activated capability level, wherein the MAC-CE indicates an antenna panel identifier of the UE or a transmission configuration indicator state list identifier associated with the activated capability level.

19. The method of claim 12, wherein the network device comprises one or more transmission and reception points for communications with the UE.

20. An apparatus for wireless communications at a user equipment (UE), comprising:
a processor;
memory coupled with the processor; and
instructions stored in the memory and executable by the processor to cause the apparatus to:

transmit a first indication of a first capability level of the UE, the first capability level corresponding to a first beam group of a plurality of beam groups, wherein the UE supports each of the plurality of beam groups in a UE cooperation mode and each beam group of the plurality of beam groups is associated with a respective set of antenna components supported by the UE in the UE cooperation mode;

transmit a second indication of a second capability level of the UE, the second capability level corresponding to a second beam group of the plurality of beam groups, wherein the first beam group, the second beam group, or both corresponds to a virtual antenna panel, the virtual antenna panel comprising at least one physical antenna panel at the UE and at least one physical antenna panel at another device associated with the UE cooperation mode;

receive signaling that indicates an activated capability level for the UE, wherein the activated capability level is one of the first capability level or the second capability level; and communicate with a network device based at least in part on the activated capability level using a corresponding beam group and the respective set of antenna components.

21. The apparatus of claim 20, wherein the instructions are further executable by the processor to cause the apparatus to:

determine a first beam group identifier for the first beam group based at least in part on a first panel identifier for a first antenna panel supported by the UE, the first antenna panel comprising a first set of antenna components associated with a first number of antenna ports, wherein the first indication comprises the first beam group identifier; and determine a second beam group identifier for the second beam group based at least in part on a second panel identifier for a second antenna panel supported by the UE, the second antenna panel comprises a second set of antenna components associated with a second number of antenna ports, wherein the second indication comprises the second beam group identifier.

22. The apparatus of claim 20, wherein the instructions are further executable by the processor to cause the apparatus to:

receive, from the network device, a first configuration for a first transmission configuration indicator list, the first transmission configuration indicator list including a first plurality of transmission configuration states for the UE, wherein the first transmission configuration indicator list is associated with the first beam group; and receive, from the network device, a second configuration for a second transmission configuration indicator list, the second transmission configuration indicator list including a second plurality of transmission configuration states for the UE, wherein the second transmission configuration indicator list is associated with the second beam group.

23. The apparatus of claim 22, wherein the instructions are further executable by the processor to cause the apparatus to:

determine a first beam group identifier for the first beam group based at least in part on a first identifier for the first transmission configuration indicator list, wherein the first indication comprises the first beam group identifier; and determine a second beam group identifier for the second beam group based at least in part on a second identifier for the second transmission configuration indicator list, wherein the second indication comprises the second beam group identifier.

24. The apparatus of claim 20, wherein the instructions are further executable by the processor to cause the apparatus to:

determine a first antenna panel supported by the UE, wherein the first antenna panel is the at least one physical antenna panel at the UE and the first indication indicates the first antenna panel; and determine a second antenna panel supported by the UE, wherein the second antenna panel is the virtual antenna panel comprising the at least one physical antenna panel at the another device and the second indication indicates the second antenna panel.

25. The apparatus of claim 20, wherein the instructions are further executable by the processor to cause the apparatus to:

apply the activated capability level after an activation time period, wherein the first beam group is associated with a first activation time period and the second beam group is associated with a second activation time period.

26. An apparatus for wireless communications at a network device, comprising:

a processor;

memory coupled with the processor; and instructions stored in the memory and executable by the processor to cause the apparatus to:

receive, from a user equipment (UE), a first indication of a first capability level of the UE, the first capability level corresponding to a first beam group of a plurality of beam groups, wherein the UE supports each of the plurality of beam groups in a UE cooperation mode and each beam group of the plurality of beam groups is associated with a respective set of antenna components supported by the UE in the UE cooperation mode;

receive a second indication of a second capability level of the UE, the second capability level corresponding to a second beam group of the plurality of beam groups, wherein the first beam group, the second beam group, or both corresponds to a virtual antenna panel, the virtual antenna panel comprising at least one physical antenna panel at the UE and at least one physical antenna panel at another device associated with the UE cooperation mode;

select an activated capability level for the UE from the first capability level and the second capability level; and transmit, to the UE, signaling that indicates the activated capability level, wherein the activated capability level is one of the first capability level or the second capability level.

27. The apparatus of claim 26, wherein the instructions are further executable by the processor to cause the apparatus to:

communicate with the UE according to the activated capability level and a corresponding beam group, wherein the activated capability level is associated with the corresponding beam group for communications with the UE.

28. The apparatus of claim 26, wherein the instructions are further executable by the processor to cause the apparatus to:
- transmit, to the UE, a first configuration for a first transmission configuration indicator list, the first transmission configuration indicator list including a first plurality of transmission configuration states for the UE, wherein the first transmission configuration indicator list is associated with the first beam group; and
- transmit, to the UE, a second configuration for a second transmission configuration indicator list, the second transmission configuration indicator list including a second plurality of transmission configuration states for the UE, wherein the second transmission configuration indicator list is associated with the second beam group.

29. The apparatus of claim 26, wherein the instructions are further executable by the processor to cause the apparatus to:
- communicate with the UE according to a number of multiple input multiple output transmission layers, wherein the number of multiple input multiple output transmission layers is based at least in part on the activated capability level.

30. The apparatus of claim 26, wherein the instructions are further executable by the processor to cause the apparatus to:
- transmit, to the UE, downlink control information that schedules data for the UE; and
- communicate, after an activation time period, the data with the UE, wherein the activation time period is based at least in part on the activated capability level.

* * * * *